(12) United States Patent
Moon et al.

(10) Patent No.: US 10,554,260 B2
(45) Date of Patent: Feb. 4, 2020

(54) USER TERMINAL DEVICE AND INFORMATION PROVIDING METHOD USING THE SAME

(71) Applicant: SAMSUNG ELECTRONICS CO., LTD., Suwon-si (KR)

(72) Inventors: Bo-seok Moon, Gunpo-si (KR); Jae-woo Ko, Uiwang-si (KR); Hee-won Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 143 days.

(21) Appl. No.: 13/858,421

(22) Filed: Apr. 8, 2013

(65) Prior Publication Data

US 2013/0267174 A1 Oct. 10, 2013

(30) Foreign Application Priority Data

Apr. 8, 2012 (KR) .................. 10-2012-0036472

(51) Int. Cl.
| | | |
|---|---|---|
| H04B 5/02 | (2006.01) | |
| H04B 5/00 | (2006.01) | |
| G01C 21/36 | (2006.01) | |
| H04L 29/08 | (2006.01) | |
| H04W 4/02 | (2018.01) | |
| H04W 88/04 | (2009.01) | |

(52) U.S. Cl.
CPC ......... *H04B 5/0031* (2013.01); *G01C 21/362* (2013.01); *H04L 67/2828* (2013.01); *H04L 67/303* (2013.01); *H04W 4/023* (2013.01); *H04W 88/04* (2013.01)

(58) Field of Classification Search
CPC ... G06K 19/0723; H04B 5/02; H04M 1/7253; H04W 76/02
USPC .............. 455/41.1, 41.2, 185.1, 456.1, 404.2
See application file for complete search history.

(56) References Cited

U.S. PATENT DOCUMENTS

| | | | |
|---|---|---|---|
| 8,532,571 B2* | 9/2013 | Murray et al. ................ 455/41.1 |
| 8,538,477 B2* | 9/2013 | Goodman et al. .......... 455/556.1 |
| 8,624,725 B1* | 1/2014 | MacGregor ........... H04W 4/029 340/539.13 |
| 8,818,270 B2* | 8/2014 | Murray et al. ................ 455/41.1 |
| 2002/0169551 A1* | 11/2002 | Inoue ..................... G01O 21/26 701/469 |
| 2004/0002305 A1 | 1/2004 | Byman-Kivivuori et al. |

(Continued)

FOREIGN PATENT DOCUMENTS

| CN | 101527752 A | 9/2009 |
|---|---|---|
| CN | 101789966 A | 7/2010 |

(Continued)

OTHER PUBLICATIONS

Communication issued May 30, 2014, by the Australian Patent Office in related Application No. 2013203008.

(Continued)

*Primary Examiner* — Zhiyu Lu
(74) *Attorney, Agent, or Firm* — Sughrue Mion, PLLC

(57) ABSTRACT

A method of receiving data from an external data source is provided. The method includes receiving device information of the target device provided by the target device through near field communication (NFC), and transmitting a subset of the data selected based on the device information to the target device.

13 Claims, 36 Drawing Sheets

(56) References Cited

U.S. PATENT DOCUMENTS

| | | | |
|---|---|---|---|
| 2007/0069923 A1* | 3/2007 | Mendelson | G01O 21/206 340/988 |
| 2009/0043499 A1* | 2/2009 | Endo | G01O 21/3492 701/414 |
| 2009/0327308 A1* | 12/2009 | Carter et al. | 707/10 |
| 2010/0004854 A1* | 1/2010 | Shin | G01C 21/3415 701/533 |
| 2010/0114683 A1* | 5/2010 | Wessels | G06Q 30/02 705/14.13 |
| 2010/0138151 A1* | 6/2010 | Jang | G01O 21/3476 701/533 |
| 2010/0146123 A1* | 6/2010 | Park | G06F 9/5077 709/226 |
| 2010/0178868 A1 | 7/2010 | Charrat | |
| 2010/0293263 A1 | 11/2010 | Caire et al. | |
| 2011/0072425 A1 | 3/2011 | Lemonnier et al. | |
| 2011/0086631 A1* | 4/2011 | Park | H04M 1/7253 455/419 |
| 2011/0087907 A1* | 4/2011 | Jantunen | H02J 17/00 713/320 |
| 2011/0276961 A1 | 11/2011 | Johansson et al. | |
| 2011/0287718 A1 | 11/2011 | Abel et al. | |
| 2012/0143496 A1* | 6/2012 | Chitre | G01O 21/362 701/428 |
| 2012/0280040 A1* | 11/2012 | Carney | G06Q 20/0453 235/383 |
| 2012/0321057 A1* | 12/2012 | Goodman et al. | 379/90.01 |
| 2013/0009756 A1* | 1/2013 | Lu | 340/10.42 |
| 2013/0104238 A1* | 4/2013 | Balsan et al. | 726/26 |
| 2013/0185137 A1* | 7/2013 | Shafi | G06Q 30/02 705/14.35 |
| 2014/0101576 A1* | 4/2014 | Kwak et al. | 715/761 |
| 2014/0185088 A1* | 7/2014 | Lee et al. | 358/1.15 |

FOREIGN PATENT DOCUMENTS

| | | |
|---|---|---|
| CN | 101894452 A | 11/2010 |
| CN | 102340540 A | 2/2012 |
| KR | 10-2007-0023579 A | 2/2007 |
| KR | 10-2008-0078300 A | 8/2008 |
| KR | 10-2009-0003455 A | 1/2009 |
| KR | 10-1100220 A | 12/2011 |
| WO | 2008/071925 A1 | 6/2008 |

OTHER PUBLICATIONS

Extended Search Report dated Jul. 3, 2013, issued by the European Patent Office in counterpart European Application No. 13162768.9.

International Search Report dated Aug. 23, 2013, issued by the International Searching Authority in counterpart International Application No. PCT/KR2013/002933.

Written Opinion dated Aug. 23, 2013, issued by the International Searching Authority in counterpart International Application No. PCT/KR2013/002933.

Communication dated Oct. 1, 2014 issued by Australian Patent Office in counterpart Australian Patent Application No. 2013203008.

Communication dated Jul. 31, 2017, from the State Intellectual Property Office of People's Republic of China in counterpart Application No. 201380018840.4.

Communication dated Dec. 20, 2017 by the Korean Intellectual Property Office in counterpart Korean Patent Application No. 10-2012-0036472.

Communication dated Jan. 30, 2018 by the State Intellectual Property Office of P.R. China in counterpart Chinese Patent Application No. 201380018840.4.

* cited by examiner

USER TERMINAL DEVICE AND INFORMATION PROVIDING METHOD USING THE SAME

CROSS-REFERENCE TO RELATED APPLICATIONS

This application claims priority from Korean Patent Application No. 10-2012-0036472, filed on Apr. 8, 2012, in the Korean Intellectual Property Office, the disclosure of which is incorporated herein by reference in its entirety.

BACKGROUND

1. Field

Methods and apparatuses consistent with the exemplary embodiments relate to a user terminal device and an information providing method using the same, and more particularly, to a user terminal device that can transmit information obtained from an external object to other devices, and a method using the same.

2. Description of the Related Art

Owing to recent development of communication technology, users of a user terminal device may easily obtain a wide variety of information. For example, the users may receive information from a web server through the Internet, or may receive information from various information sources using near field communications techniques.

In particular, in near field communication (NFC), data may be transmitted and received when terminals are in close proximity to each other without otherwise requiring a user's control. Particularly, NFC is a contactless technology that can transmit data over short range with low power using radio frequency identification (RFID) technology in the 13.56 MHZ frequency band.

Thus, data may be collected through multiple routes, such as Internet and by NFC, according to a user's needs.

SUMMARY

Exemplary embodiments overcome the above disadvantages and other disadvantages not described above. Also, the exemplary embodiments are not required to overcome the disadvantages described above, and an exemplary embodiment of the present invention may not overcome any of the problems described above.

According to an aspect of an exemplary embodiment, there is provided a method of providing information from a mobile terminal to a target device, the method including: receiving data from an external data source, receiving device information of a target device provided by the target device through near field communication (NFC), and transmitting a subset of the obtained data selected based on the device information to the target device.

The mobile terminal may include a near field communication (NFC) module, and the receiving data may include the NFC module receiving the data from the external data source by NFC.

The receiving data may include the NFC module reading the data from a near field communication tag of the external object.

The method may further include selecting the subset of the obtained data based on the device information.

The mobile terminal selecting the subset may include parsing the data, normalizing the parsed data, and selecting the subset from among the normalized data based on the device information.

The data may be raw data of the external data source.

The device information may include at least one of a capability of the target device, a specification of the target device, and a uniform resource locator (URL) of the capability of the target device or the specification target device.

The selecting may include transmitting the data and the device information to a server and receiving the subset from the server.

The method may further include displaying a message requesting confirmation of the subset and receiving an input indicating confirmation of the subset, and the transmitting may further include transmitting the subset to the target device in response to receiving the input indicating confirmation of the subset.

The selecting may further include selecting the subset based on the device information and at least one of time information of the data, a current time, and location information of the mobile terminal.

According to an aspect of another exemplary embodiment, there is provided a user terminal device including: a communication unit that receives data from an external data source and receives device information of a target device from the target device through near field communication (NFC) and a controller that controls the communication unit to transmit a subset of the data selected based on the device information to the target device.

According to an aspect of another exemplary embodiment, there is provided a non-transitory computer-readable medium having embodied thereon a program for executing a method of controlling a mobile terminal to provide information from the mobile terminal to a target device, the method including obtaining data from an external data source, receiving device information of a target device provided by the target device through near field communication (NFC), and transmitting a subset of the data selected based on the device information to the target device.

According to the various exemplary embodiments, information corresponding to the features of the devices may be extracted from information obtained from various sources and may be transmitted to the devices, thereby improving user convenience.

BRIEF DESCRIPTION OF THE DRAWINGS

The above and other aspects will be more apparent by describing certain exemplary embodiments with reference to the accompanying drawings, in which.

DETAILED DESCRIPTION OF EXEMPLARY EMBODIMENTS

Figure 1:
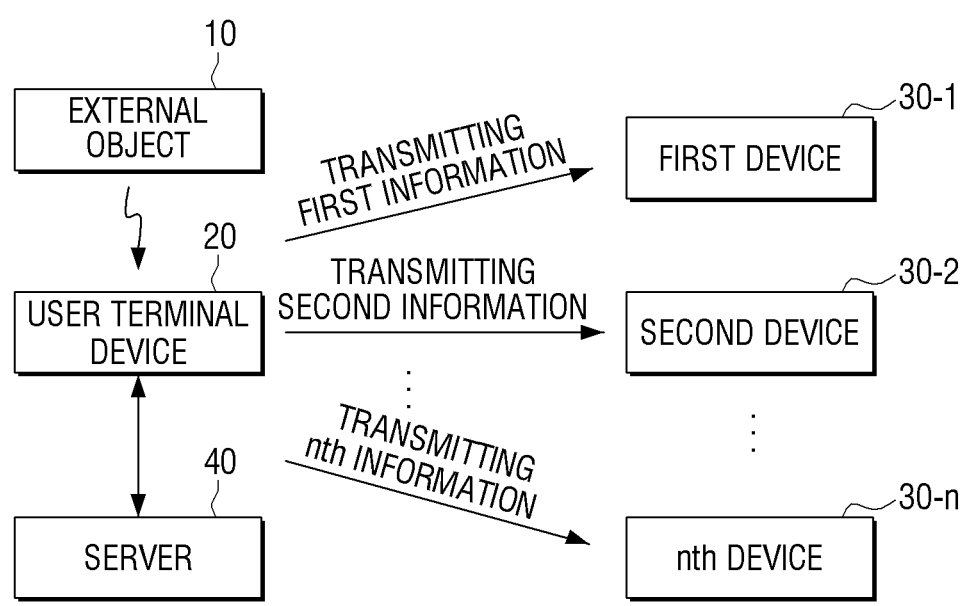
FIG. 1 is a view for schematically explaining a structure of an information providing system in accordance with an exemplary embodiment.

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the invention. Thus, it is apparent that the exemplary embodiments may be carried out without those specifically defined matters. Also, well-known functions or constructions are not described in detail since they would obscure the invention with unnecessary detail.

FIG. 1 is a view for schematically describing a structure of an information providing system in accordance with an exemplary embodiment. According to FIG. 1, the information providing system includes an external object 10, a user terminal device 20, and a first to nth device 30-1, 30-2, . . . , 30-n, and a server 40.

Optionally, the information providing system may be implemented without the server 40. In addition, FIG. 1 illustrates a plurality of devices 30-1, 30-2, . . . , 30-n, but the information providing system may be implemented to include only one device. Further, while FIG. 1 illustrates only one external object 10, the information providing system may be implemented to include a plurality of external objects.

The external object 10 may be an information providing source that provides data. Specifically, the external object 10 may be implemented as a near field communication tag and may transmit data stored in the near field communication tag to user terminal device 20 if user terminal device 20 is located within a communication range of the near field communication tag.

Meanwhile, the near field communication tag may store various data.

For example, the an external object may be a near field communication tag attached in a certain place: attached in advertisement flyer at certain location, or at a location of a certain place on a map, the data written in the near field communication tag may include information on the address of the certain place, a business name, hours of operation, a phone number, global positioning system (GPS) information, history information, admission fee information, event schedule information, images related to the certain place, a URL link address, and neighboring facilities (e.g. parking lots, restaurants, tourist attractions).

The location of the tag may include commercial locations, residential locations, geographical locations, tourist attractions, a supermarket, a gas station, a play park, a subway station, a bus stop, a museum, a historic site, a hospital, a department store, a firm, an apartment, or a building.

In addition, the external object 10 is a near field communication tag attached to certain product, an advertisement flyer on the certain product, or on display stand of certain product, the data stored in near field communication tag may include information about the product, such as the product name, date of manufacture, expiration date, manufacturer, and a URL link address for additional information related to the product.

The product to which the NFC tag is attached may be any commercial product, such as groceries, clothing, home appliances, and transportation vehicles.

The user terminal device 20 may obtain data from the external object 10. In this case, the user terminal device 20 may collect data in many ways.

In an exemplary embodiment, the user terminal device 20 may obtain data from the external object 10 using near field communication. In this case, the user terminal device 20 may include a near field communication reader. Thus, data may be read from the communication tag using the near field communication reader of the of the user terminal device 20 when the external object (i.e., a communication tag) is within the a communication range of the user terminal device 20.

NFC is contactless near field communication using the 13.56 MHz frequency band. Data may be transmitted and received using NFC technology when a plurality of terminals are within communication range of each other, for example within 10 cm. Alternatively, barcode and QR code may be used.

The user terminal device 20 includes a wireless communication module for performing wireless communication using a wireless communication protocol, such as WiFi, Zigbee, or Bluetooth, and the user terminal device 20 may receive data by performing wireless communication with the external object 10. In this case, the external object 10 may separately include a wireless communication module (not illustrated) for communication with the user terminal device 20.

Data collected by the user terminal device 20 may vary according to the external objects 10 with which the user terminal device 20 communicates. That is, if a user terminal device 20 receives data from a first near field communication tag attached in a certain place, the data may include various information related to the certain place, and if the user terminal device 20 receives data from a second near field communication tag attached to certain product, the data may include information related to the certain product. For example, the data provided by the near field communication tag may be a location of the near field communication tag or a location of a product or an item to which the near field communication tag is attached, device information of a device to which the near field communication tag is attached, URL address information for obtaining additional information of a product or an item to which the near field communication tag is attached, or product information of a product or item to which the near field communication tag is attached. Similarly, the device information may include device capabilities or a device specification indicating the device capabilities.

Moreover, the data received from the external objects 10 may be raw data of various formats of the external objects 10. For example, the user terminal device 20 may receive a first type of raw data from a first external object 10 and receive a second type of raw data from a second external object 10. The first type of raw data may have a first format and the second type of raw data may have a second format. As such, the raw data may include data of different configurations, compositions, ordering, etc.

Instead of receiving information from the external object 10, the user may directly input information related to the certain place or certain product into the user terminal device 20. For example, the user may search for information related to certain place or certain product through a communication network, such as Internet.

Alternatively, instead of receiving information from the external object or the Internet, a user may obtain data from an external storage medium or from another electronic device by connecting the external storage medium or electronic device to the user terminal device 20. The external storage medium may be a Universal Serial Bus (USB) flash memory, an external hard drive, or a memory card, and the electronic devices may be a personal computer (PC), a laptop PC, a tablet PC, a mobile phone, or a navigation device.

As discussed above, the user terminal device 20 may collect information related to the certain place or the certain product using various methods. The user terminal device 20 may store collected data in a memory, such as a hard disk drive (HDD), flash memory, or other computer-readable memory. In this regard, the user terminal device 20 may collect the information as raw data and normalize the raw data as normalized data. The normalized data may be stored in the memory of the user terminal device 20, or stored in the server 40.

The user terminal device 20 may extract certain information from data obtained from the external object 10 and may deliver information to the devices 30-1, 30-2, . . . , 30-n. Specifically, the user terminal device 20 may extract information usable in each device 30-1, 30-2, . . . , 30-n based on features of the devices 30-1, 30-2, . . . , 30-n, and may appropriately transmit the extracted information (information 1, information 2, . . . , information n) to each device 30-1, 30-2, . . . , 30-n. The data transmitted to the devices 30-1 . . . 30-n may be formatted for reception and processing by the devices 30-1 . . . 30-n, for example according to an application executed by the devices 30-1 . . . 30-n. As discussed above, the user terminal device 20 may normalize the data received from the external objects 10. By normalizing the raw data, the information usable by the devices 30-1 . . . 30-n may be appropriately determined from among the various raw data received from the external objects 10 and provided to the devices 30-1 . . . 30-n. In this regard, the mobile terminal 20 may parse the raw data, normalize the parsed data, and categorize the parsed data. The categorized data may be provided to the devices 30-1 . . . 30-n according to categories associated with functions of the devices 30-1 . . . 30-n. As a result, raw data may be accumulated from external object 10 sources and may be selectively filtered for a particular device 30-1 . . . 30-n, and provided to the device 30-1 . . . 30-n.

In general, the user terminal device 20 may communicate with the devices 30-1 . . . 30-n and obtain information about the devices 30-1 . . . 30-n for filtering the data obtained from the external source 10, and selectively providing the filtered data to the devices 30-1 . . . 30-n based on the information about the devices 30-1 . . . 30-n. The filtering may be performed according to a rule, a probabilistic determination, an ontological determination, and the like. The data filtering may be performed by the user terminal device 20 or the server 40. For example, if the data from external object 10 is stored on the terminal, filtering may be performed by the user terminal device 20, thereby omitting the server 40 in an offline configuration. Alternatively, in an online (cloud) configuration, data from the external object 10 and device information about the devices 30-1 . . . 30-n may be relayed from the user terminal device 20 to the server 40, which provides results of the filtering to the user terminal device 20 for relaying to the appropriate devices 30-1 . . . 30-n, and thus the necessary storage and processing capabilities of the user terminal device 20 may be lowered. A specific method how the user terminal device 20 extracts particular information for each device 30-1 . . . 30-n based on the features of each device 30-1, 30-2, . . . , 30-n will be described later.

Results of the filtering may be displayed on the user terminal device 20 for confirmation by a user. In response to a user's confirmation, the filtered results may be transmitted to devices 30-1 . . . 30-n. In an alternative configuration, the normalized data may be displayed on the user terminal device 20, and data to be provided to devices 30-1 . . . 30-n may be selected by a user.

Data may be transmitted from the user terminal device 20 to each device 30-1, 30-2, . . . , 30-n by different data transmission methods.

For example, data may be transmitted from the user terminal device 20 using near field communication. In this case, the user terminal device 20 may include a near field communication tag and may transmit extracted information to each device 30-1, 30-2, . . . , 30-n in which a near field communication reader is attached.

Meanwhile, the user terminal device 20 may transmit extracted information to each device 30-1, 30-2, . . . , 30-n through near field communication, using wireless protocols, such as WiFi, Zigbee, or Bluetooth, or the user terminal device may transmit data over a wired connection to the devices 30-1 . . . 30-n.

The user terminal device 20 is a consumer electronic device, such as a mobile phone, a personal digital assistant (PDA), a tablet PC, and a MP3 player. Also, the user terminal device 20 may be implemented as a watch or bracelet form worn by the user. In addition, the user terminal device 20 may be implemented in a stationary device, such as a monitor, a TV, and a kiosk.

The devices 30-1, 30-2, . . . , 30-n receive information from the user terminal device 20, and may be various types of electronic devices that may perform certain functions using the received information. The devices 30-1 . . . 30-n may display the information received from the user terminal device 20 and request confirmation of the displayed information from a user. For example, the devices 30-1, 30-2, . . . , 30-n may be a navigation device, a TV, a mobile phone, a PDA, a tablet PC, and an MP3 player.

The user terminal device 20 may communicate with a server over a network, such as the Internet. The user terminal device 20 receives information related to the external object 10 by transmitting information received from the external object 10 to the server 40, which uses the information received from the external object 10 in a query. The terminal device 20 may receive additional information about the external object 10 from the server 40, and may provide additional information usable by each device 30-1, 30-2, . . . , 30-n.

The server 40 may store information in a database, and may provide additional information in response to the request of the user terminal device 20. In response to receiving the request from the user terminal device 20, the server 40 may communication with a separate information providing server (not illustrated) to obtain the additional information requested by the user terminal device 20.

As discussed above, the additional information that the server 40 provides to the user terminal device 20 may information related to the data that the user terminal device 20 has initially obtained from the external object 10.

The user terminal device 20 may obtain information usable by each device 30-1, 30-2, . . . , 30-n based on features of each device 30-1, 30-2, . . . , 30-n. The feature of the device 30-1 . . . 30-n may be a function of the device 30-1 . . . 30-n or the user information of the device 30-1 . . . 30-n.

Thus, the user terminal device 20 determines a device 30-1 . . . 30-n to which information will be provided before obtaining the information to be transmitted to the device 30-1 . . . 30-n. A process of determining which device will now be described by referring to FIGS. 2 and 3.

Figure 2:
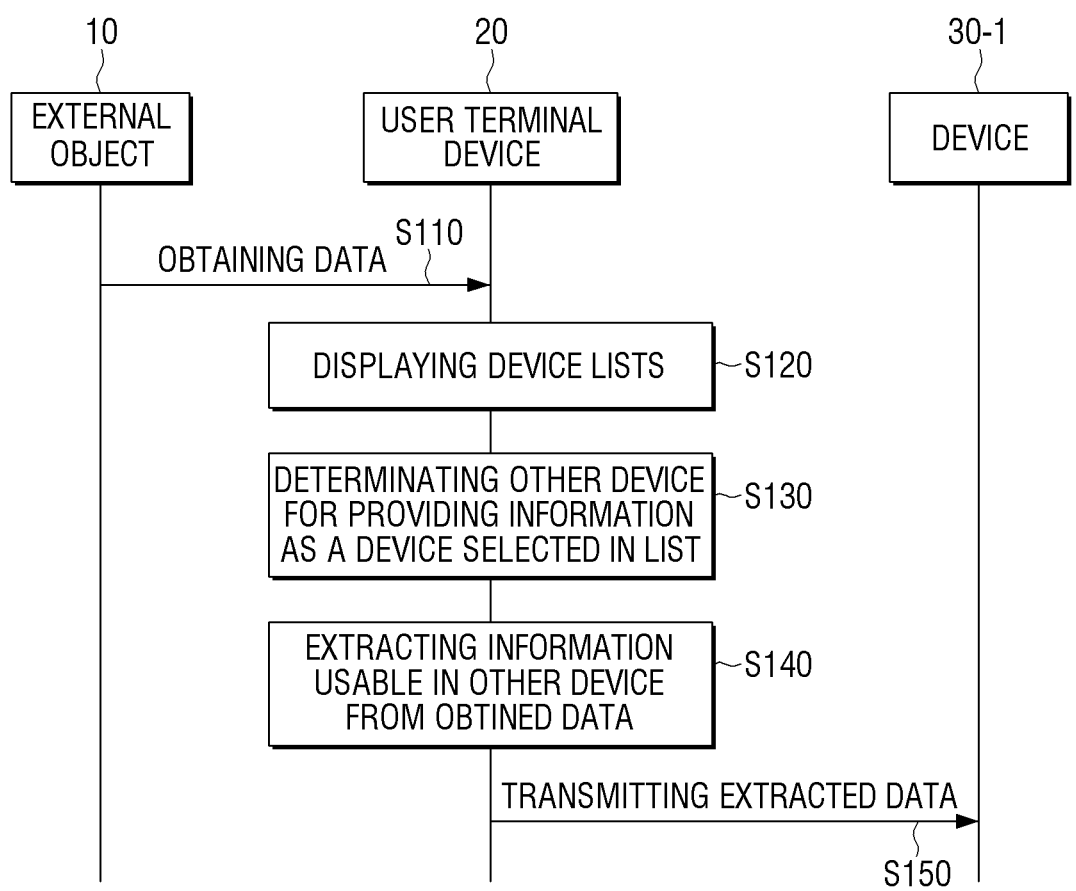
FIG. 2 is a timing view for explaining a method how a user terminal device determines a device for providing information in accordance with an exemplary embodiment.

FIG. 2 is a timing view for describing a method of determining to which device information will be provided, in accordance with an exemplary embodiment. For convenience of the description, only one device 30-1 is illustrated.

As illustrated in FIG. 2, the user terminal device 20 may obtain data from the external object 10 in step S110. In step S120, the user terminal device 20 may display a list of devices 30-1 . . . 30-n on the user terminal device 20 according to an order prescribed by the user. To display the list of devices 30-1 . . . 30-n, the user terminal device may store information on functions performed by each device. Also, the user terminal device 20 may store user information on each device 30-1 . . . 30-n. Thus, the list of devices 30-1 . . . 30-n may be displayed according to functions of the devices 30-1 . . . 30-n or user information of users of the devices 30-1 . . . 30-n.

When a certain device is selected from the list by the user, the user terminal device 20 may determine the selected device as the device 30-1 to which information will be provided in step S130.

The user terminal device 20 extracts information usable by the device 30-1 from the obtained data in step S140, and transmits the extracted information to the device 30-1 in step S150. In this case, the user terminal device 20 extracts information usable by the device 30-1 from the obtained data based on at least one of the function performed by the device 30-1 and user information of the device 30-1.

Figure 3:
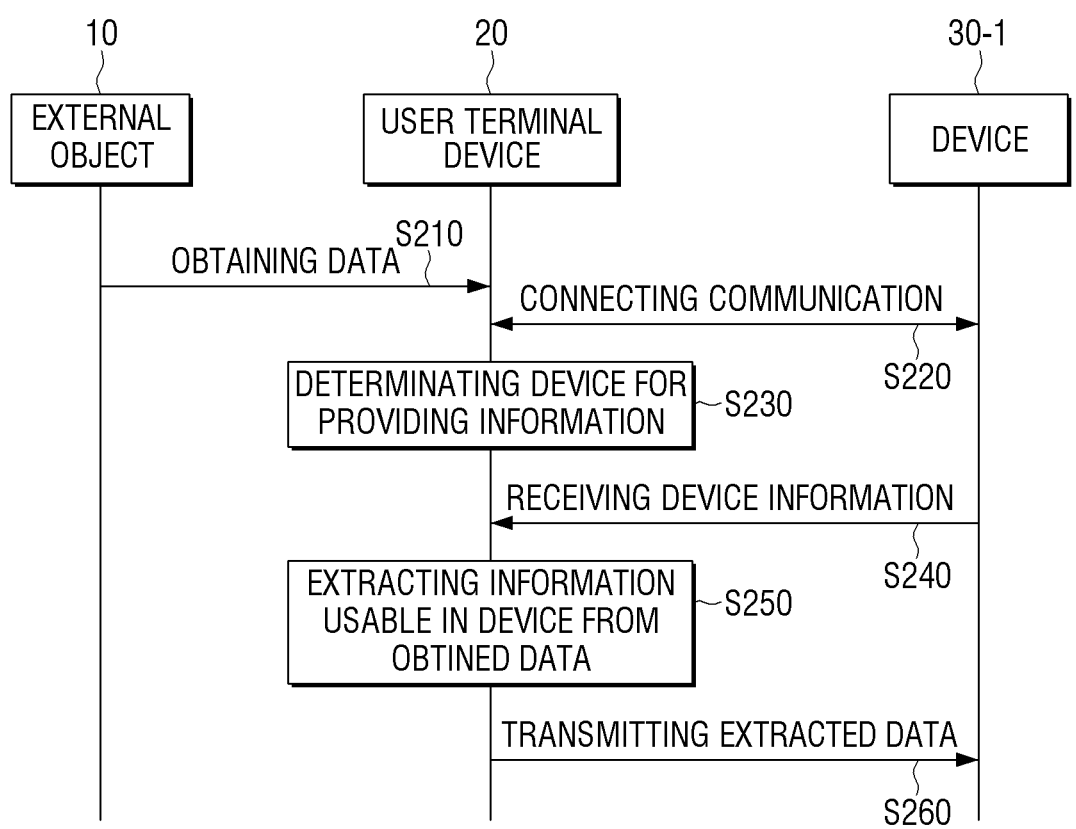
FIG. 3 is a timing view for explaining a method how a user terminal device determines a device for providing information in accordance with an exemplary embodiment.

FIG. 3 is a timing view for describing the user terminal device 20 determining to which device information is to be provided, in accordance with an exemplary embodiment. For convenience of the description, only one device 30-1 is illustrated in.

As illustrated in FIG. 3, the user terminal device 20 obtains data from the external object 10 in step S210. The user terminal device 20 may search for adjacent devices according to an order proscribed by the user in step S220. Specifically, the user terminal device 20 may search for devices communicating wirelessly with the user terminal device and may establish a communication connection with discovered devices.

The user terminal device 20 may determine the device 30-1 to be the device to which information is to be provided in step S230. The user terminal device 20 may transmit a request message for information of the device 30-1 to the device 30-1 once the connection is established, and may receive the device information of the device 30-1 from the device 30-1 in step S240. Here, the device information may include at least one of the functions of the device 30-1 and the user information of the device 30-1. For example, the functions of the device may include functions of software executed by the device, data that is used as input to the device or the software, a data type processed by the device or the software, or other processing performed by the software or the device.

The user terminal device 20 may have previously performed communication with the device 30-1 and records the device information of the device 30-1 in the user terminal device 20. In this case, the device information may be obtained without a separate request to the device 30-1 using the previously recorded information.

The user terminal device 20 extracts information usable by the device 30-1 from the data stored at the user terminal device 20 based on at least of the functions of the device 30-1 and the user information of the device 30-1 in step S250, and transmits the extracted information to the device 30-1 in step S260.

Figure 4:
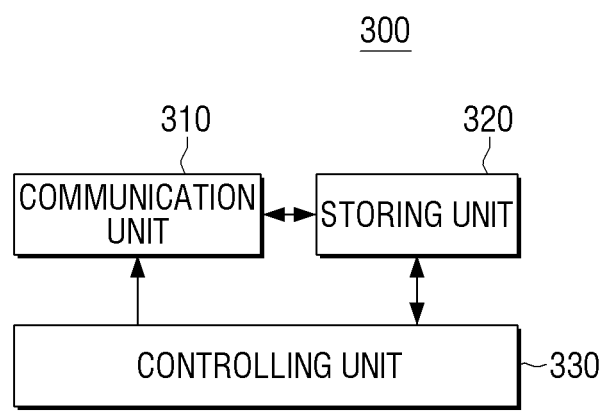
FIG. 4 is a block diagram for explaining the structure of a user terminal device in accordance with an exemplary embodiment.

FIG. 4 is a block diagram for describing the structure of a user terminal device in accordance with an exemplary embodiment. As illustrated in FIG. 4, the user terminal device 300 includes a communication unit 310, a storing unit 320, and a controlling unit 330.

The communication unit 310 may obtain data through NFC from an external object. Specifically, the communication unit 310 may include a near field communication module and may obtain data by reading data stored in a near field communication tag.

Here, the near field communication module may include a near field communication reader and a near field communication tag.

If the communication unit 310 includes the near field communication reader, the near field communication reader may read information stored within the near field communication tag and store the obtained information in the storing unit 320.

The near field communication reader may be composed of a wireless frequency module and an antenna coil. The near field communication reader emits electromagnetic waves through the antenna coil. Thus, electricity is induced according to electromagnetic induction in the near field communication tag (not illustrated) attached in the external object located within electromagnetic wave range of the user terminal device 300. Thus, an integrated circuit within the near field communication tag is operated and RF signal including the stored data is transmitted. The wireless frequency module within the near field communication reader receives the RF signal through the antenna coil, and detects data on the RF signal by performing demodulation and decoding on received the RF signal.

The storing unit 320 may store data obtained by the communication unit 310. Here, the obtained data may vary depending on the data contained in one or more NFC tags read by the communication unit 310.

For example, the external object may be a near field communication tag attached in certain place: attached in advertisement flyer at a certain place, or at a location of a certain place on a map; information stored in the storing unit 330 may include information on the address of the certain place, a business name, business hours of operation, a phone number, GPS information, history information, admission fee information, event schedule information, images related to the certain place, a URL link address, and information about nearby facilities (e.g. parking lots, restaurants, tourist attractions).

In addition, the external object may be a near field communication tag attached to a certain product, an advertisement flyer on the certain product, or on a display stand of the certain product; the information stored in the storing unit 320 may include information about the product, such as the product name, date of manufacture, expiration date, manufacturer, and a URL link address for additional information related to the product.

In addition, the storing unit 320 may store device information, such as a device name, functions performed by each device, and user information for users of each device. Here, this information may be stored in the user terminal device 300 when manufactured, or may be input through use of the device.

Meanwhile, the controlling unit 330 may store information stored in the storing unit 320 according to a format accessible by the user terminal device 300. For example, if the size information that is stored in the storing unit 320 is greater than the space available in the storing unit 320, the information may be compressed or reduced in size by eliminating unnecessary data. Further, if space in the storing unit 320 of the user terminal device 300 is insufficient, the information may be stored by transmitting the information to a server (not illustrated) or other external device for remotely storing the data.

The controlling unit 330 extracts information usable by other devices from the stored data based on the features of the other devices when it is determined to provide information to the other devices, and may control the communication unit 310 to provide information to the another device. Here, the device may be the device 30-1 that is referenced in FIGS. 2 and 3.

That is, the controlling unit 330 may determine the device selected by a user as the device to which information is provided. In this case, at least one of a function of the selected device and the user information of the selected device may be stored in the storage unit 320.

In addition, the controlling unit 330 may determine to provide information to the external device if communication is established with the external device through the communication unit 310. In this case, the external device may transmit at least one of a function the external device performs and the user information of the external device, and this information may be stored in the storage unit 320.

If the device to which information is to be provided is determined, the controlling unit 330 may extract information usable by the device from the data stored in the storage unit 320 based on features of the device. Here, the feature of the device may include at least one function performed by the other device or the user information of the device.

The communication unit 310 may communicate with the device using various techniques. For example, the communication unit 310 may include the near field communication tag, and may communicate with the device through wireless communication, or may communicate with the device through a wired connection.

Meanwhile, the controlling unit 330 may control the communication unit 310 to provide the extracted information to the device. For example, when using NFC, the controlling unit 330 may transform the extracted information into a data format that may be interpreted by the near field communication tag, and may record the transformed data in the near field communication tag. Meanwhile, the controlling unit 330 may control the extracted information to be transmitted to the device after transforming the extracted information into the data format in accordance with the wired communication method or the wireless communication method.

A controlling unit 330 may extract information usable by the device in accordance with the function of the device in the stored data. The following describes a case when the function of the device is a route guidance (i.e. navigation) function for providing directions from a starting location to a finishing destination desired by a user.

The controlling unit 330 may extract location information usable in a route guidance function in the device from the stored data, if the route guidance function is supported by the device.

The location information used in the route guidance function may include an address, a name of a place, a name of a brand, a name of a building, a phone number, or GPS information, and the controlling unit 330 may extract this information from the stored data.

First, the controlling unit 330 may extract location information usable by the route guidance function based on the format of the data. The controlling unit 330 may extract information usable by the route guidance function from a data stream using an indicator that indicates content of the information included in each field of the data stream. Here, the indicator may be transmitted in a certain area of the stream.

For example, an address of certain place, GPS information, a name of a place, an admission fee, and an event schedule are included in data received from the external object. In this case, the controlling unit 320 may determine locations of a fields in which information is stored, such as the address, the GPS information and the name of a place, which are the particular information usable by the route guidance function, and the locations may be determined using the indicator in the data. The controlling unit 320 may also parse information to determine the address, the GPS information, and the name from each field, without using the indicator.

The controlling unit 330 may extract location information usable by the route guidance function from data by using a predetermined keyword, if the data received from the external object is expressed in text form.

Here, the predetermined keyword may be a letter or a series of numbers for extracting information usable by the route guidance function, and the keyword may be stored in the storing unit 320.

Specifically, the predetermined keyword may be a name of administrative district that is commonly included in an address, such as "city", "gu", "dong", "street address", "do-province", "gun-county", "myeon", and "eup-town", and may be a word commonly included in the name of a building, such as "building" and "shopping district". Meanwhile, the predetermined keyword may also be a series or combination of numbers, brand names, or place names for detecting a phone number and or GPS information.

Thus, the controlling unit 330 may read the predetermined keyword from the storing unit 320 when data is received in text form, and may extract information matching the keyword from data as the location information usable by the route guidance setting.

The controlling unit 330 may extract a brand name, a phone number, a GPS information, and a place name from the obtained data using a server (not illustrated).

Specifically, the controlling unit 330 may transmit data in text form to the server and may receive a brand name, a phone number, GPS information, and a place name from the server. For transmission, a user terminal device 300 may further include a communication module (not illustrated) that may communicate with the server in accordance with various wired or wireless communication methods. Meanwhile, the server may store different information, including brand name, phone number, GPS information, and place name in a database, may detect text matching the brand name, phone number, GPS information, and place name from data in text form that is received from the user terminal device 300, and may transmit the text to the user terminal device 300.

Though it is described that the server is external to the user terminal device 300 in the exemplary embodiment described above, but this is only one example. That is, the server may be built in the user terminal device 300.

In the following, if the device performs the route guidance function, one example of extracting information from the user terminal device will be described by referring to FIG. 5.

Figure 5:
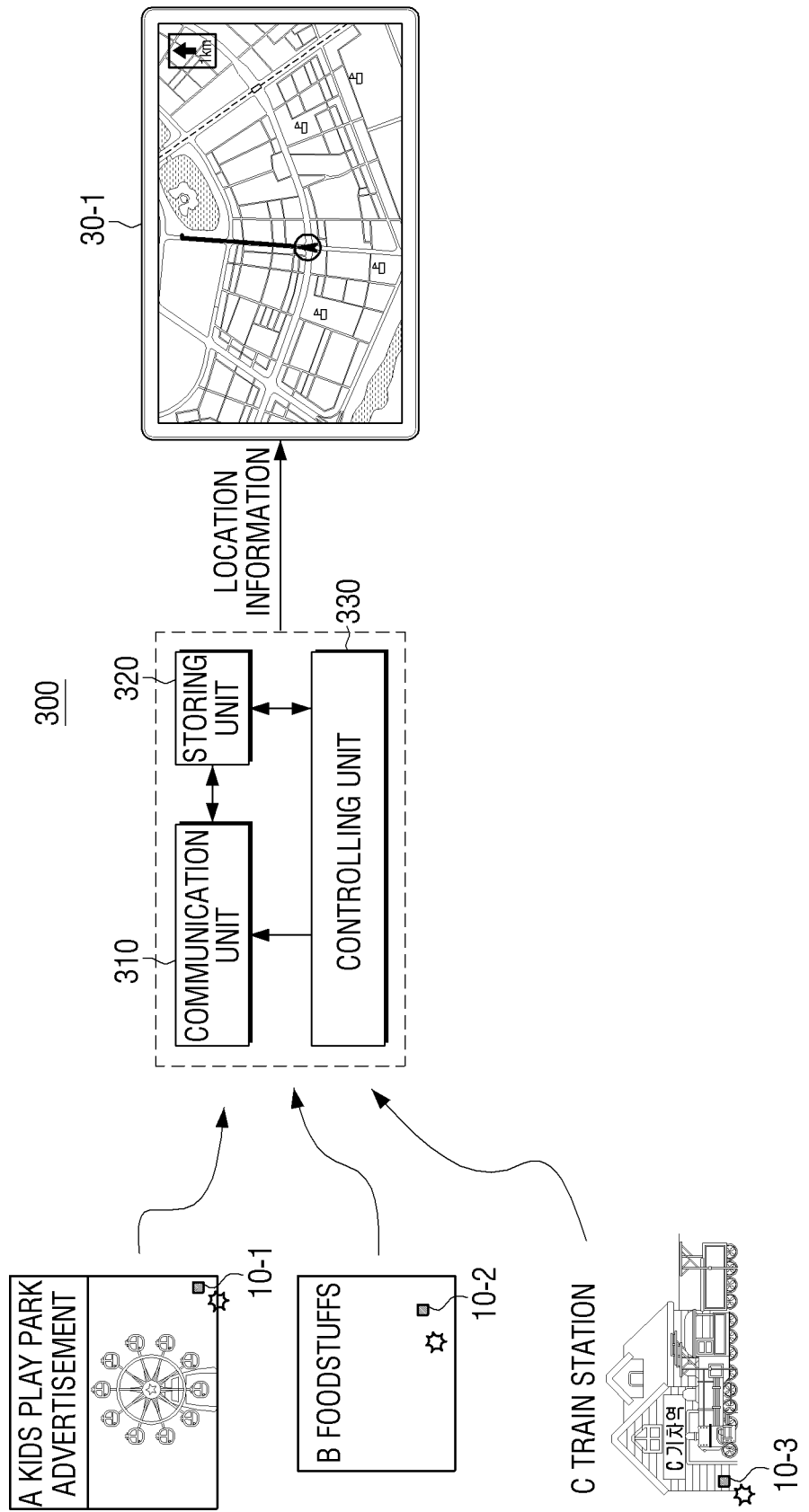
FIG. 5 is a view for describing information provided from a user terminal device if the other device for providing information may perform route guidance function in accordance with an exemplary embodiment.

FIG. 5 is a view for describing information provided from a user terminal device when the device to which information is to be provided may perform a route guidance function.

Referring to FIG. 5, the communication unit 310 may receive information on an address, a brand name, GPS information, hours of operation, and an event schedule of a park A from an external object 10-1 through NFC with an external object 10-1 attached to a park A advertisement flyer, and may receive information on product name, manufacturer, and price of foodstuff B by performing NFC with an external object 10-2 attached to foodstuff B. In addition, the communication unit 310 may receive information on an address, and a train timetable of train station C from an external object 10-3 by performing NFC with an external object 10-3 posted in train station C. The data received from park A, foodstuff B, and train station C may be stored in the storing unit 320.

Meanwhile, if the device supports a route guidance function, the controlling unit 330 may extract the location information that may be used in route guidance function from the stored data, and may transmit the location information to the other device 30-1. That is, in case of FIG. 5, the controlling unit 330 may extract address information of park A, brand name, and GPS information related to the location, and address of train station C among all the information about park A, on foodstuff B, and train station C, and may transmit extracted location information to the device 30-1.

Meanwhile, the device 30-1 may receive the information and use the location information to perform the route guidance function, as described with respect to FIGS. 6 to 16.

Figure 6:
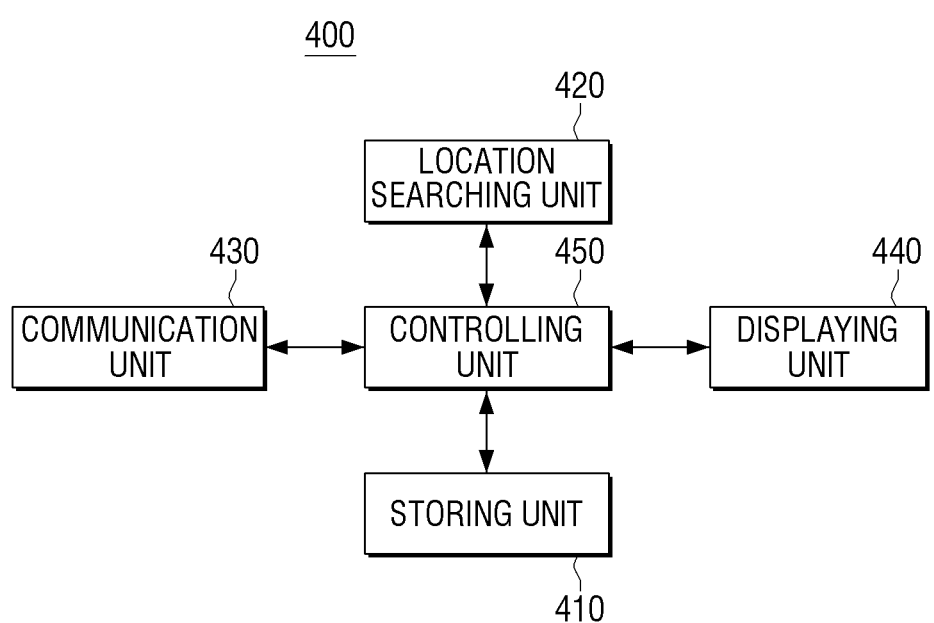
FIG. 6 is a block diagram for describing a structure of the other device performing route guidance function in accordance with an exemplary embodiment.

FIG. 6 is a block diagram for describing a structure a device performing the route guidance function in accordance with an exemplary embodiment. In the case that a typical device performing route guidance function is a navigation device, FIG. 6 describes the case that the device is implemented as a navigation device. According to FIG. 6, a navigation device 400 includes a storing unit 410, a location searching unit 420, a communication unit 430, a displaying unit 440, and a controlling unit 450.

The navigation device 400 provides the navigation function for navigating a user from a starting location to an ending destination. The navigation device 400 may be a portable device connected to a vehicle, and may be a built-in device in the vehicle itself. Alternatively, the navigation 400 may be a standalone device. The navigation device 400 may perform the navigation function by processing navigation data, such as an address or GPS information. Accordingly, the navigation function may be associated with various types of data that may be processed by the navigation device, and the navigation device 400 may provide the navigation function or the associated data types to the user terminal device 300 for determining data to be provided to the navigation device 400.

Navigation map information, navigation firmware, and other application data are stored in the storing unit 410. In addition, the storing unit 410 may store location information provided from the user terminal device 300 to perform the navigation function.

The location searching unit 420 searches for a location required by the navigation device 400. The location may be input by a user.

Specifically, the location searching unit 420 may prepare a GPS module and search for a location using a GPS signal. The GPS module receives a signal transmitted from a plurality of GPS satellites and calculates a distance between the satellite and the navigation device 400 using a time difference between a transmission time and a reception time. The GPS module may calculate a current location of the navigation device 400 through triangulation by considering an overall distance calculated among each of a plurality of satellites and location information of the satellites.

The communication unit 430 may perform wired or wireless communication with the user terminal device 300.

For example, when using NFC, the communication unit 430 may include a near field communication reader for receiving information through tagging with the user terminal device 300. In addition, the communication unit 430 may communicate with the other device by wireless communication or wired communication.

In particular, the communication unit 430 may receive location information usable by a route guidance function from the user terminal device 300 through communication with the user terminal device 300. Here, the location information may include an address, a place name, a brand name, a building name, a phone number, GPS information, etc.

A navigation map may be displayed in planar image or 3D image depending on the specifications of the navigation device 400. The controlling unit 450 may include a rendering module (not illustrated) to compose the navigation map.

The controlling unit 450 may receive information that is needed for performing the navigation function and control the displaying unit 440. For example, a user may select a destination on a displayed screen and may select a route to the destination.

In addition, the controlling unit 450 may display location information by displaying the location information received from present location of the navigation device 400 and the user terminal device 300 on the navigation map, and may provide a route from the present location and the user terminal device 300 on the navigation map. In this case, the location information received from the user terminal device 300 may be displayed as text or an image that may indicate a corresponding location, such as a place name, a brand name, or a building name.

FIGS. 7 to 16 are views for describing screen displayed in the navigation device in accordance with an exemplary embodiment.

First, the controlling unit 450 may display a list of location information if a plurality of location information is received from the user terminal device 300 and display the list on the displaying unit 440, and may provide route from a present location to a destination location selected from the list.

Figure 7:
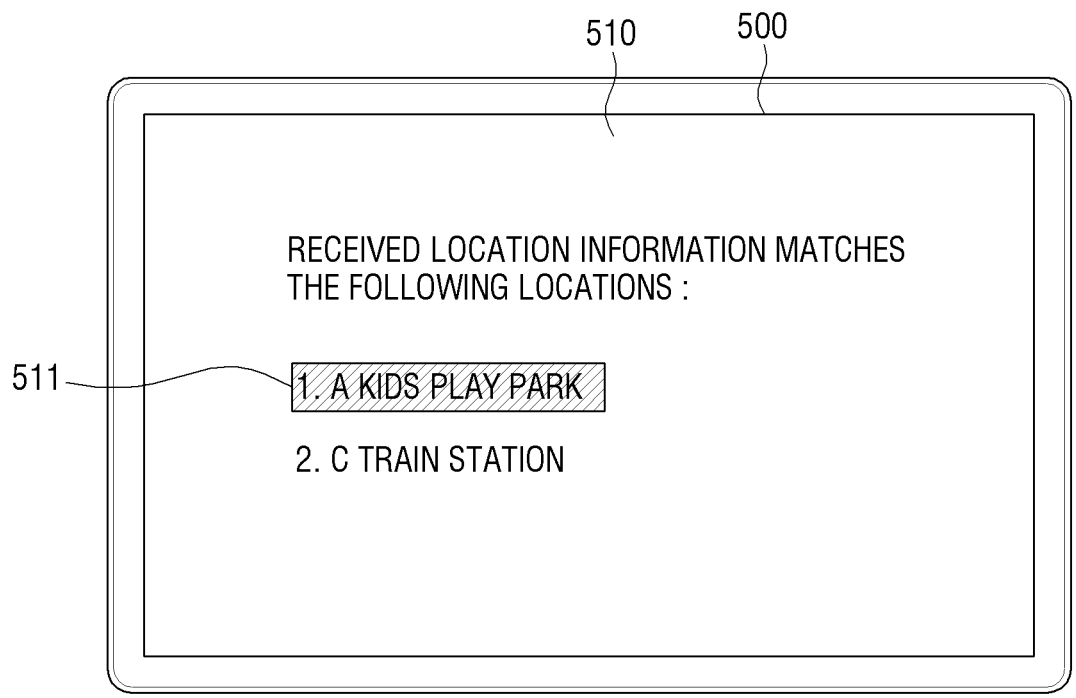
FIGS. 7-16 are views for describing a screen displayed in a navigation device in accordance with an exemplary embodiment.
Figure 8:
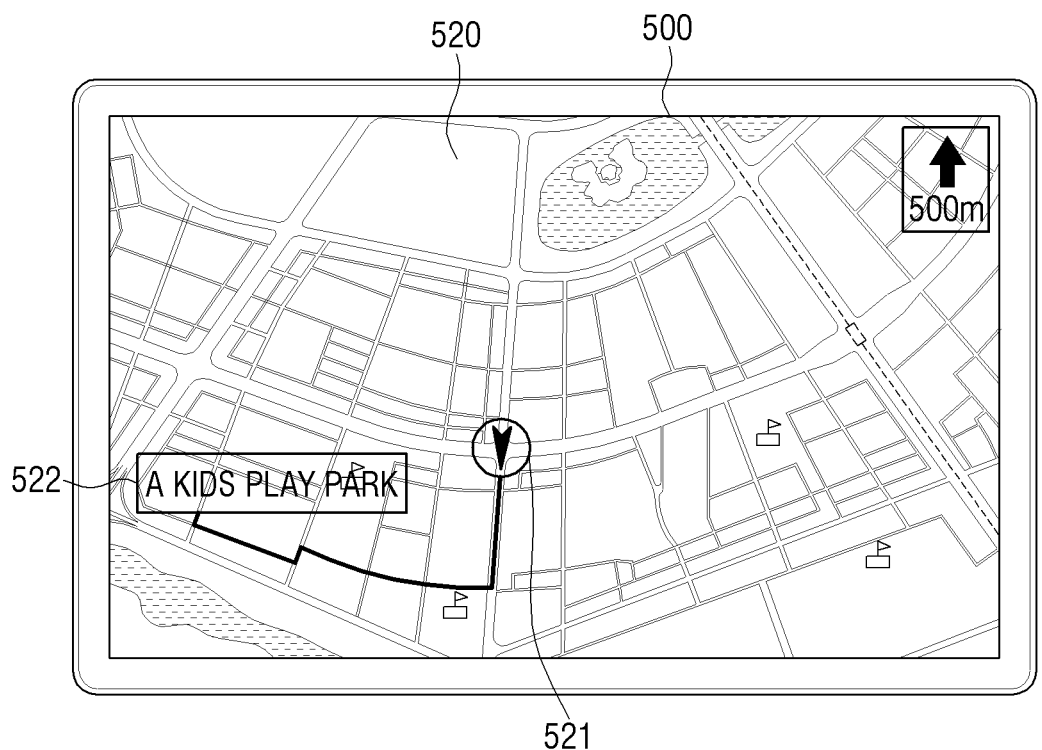

For example, in FIG. 7, if the location information on park A and train station C is received from the user terminal device 300, a screen 510 listing park A and train station C is displayed by the displaying unit 500. If a user selects park A 511, the navigation map, in which the route from a present location 521 to park A 522 is set, may be displayed on the displaying unit 500, as shown in FIG. 8.

Though, the exemplary embodiment above describes that a list of location information is displayed if a plurality of location information is received from the user terminal device 300, this is only one example. For example, if one of location information is received, the controlling unit 450 may automatically perform route guidance from a present location to a corresponding received location without separated order of the user.

Figure 9:
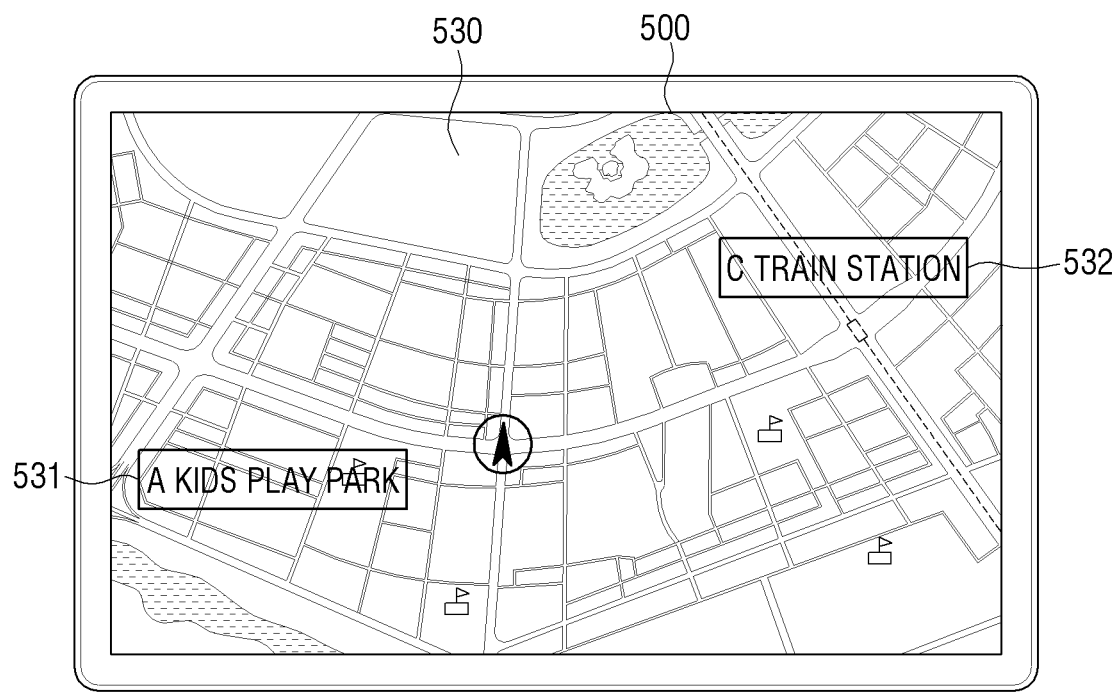
Figure 10:
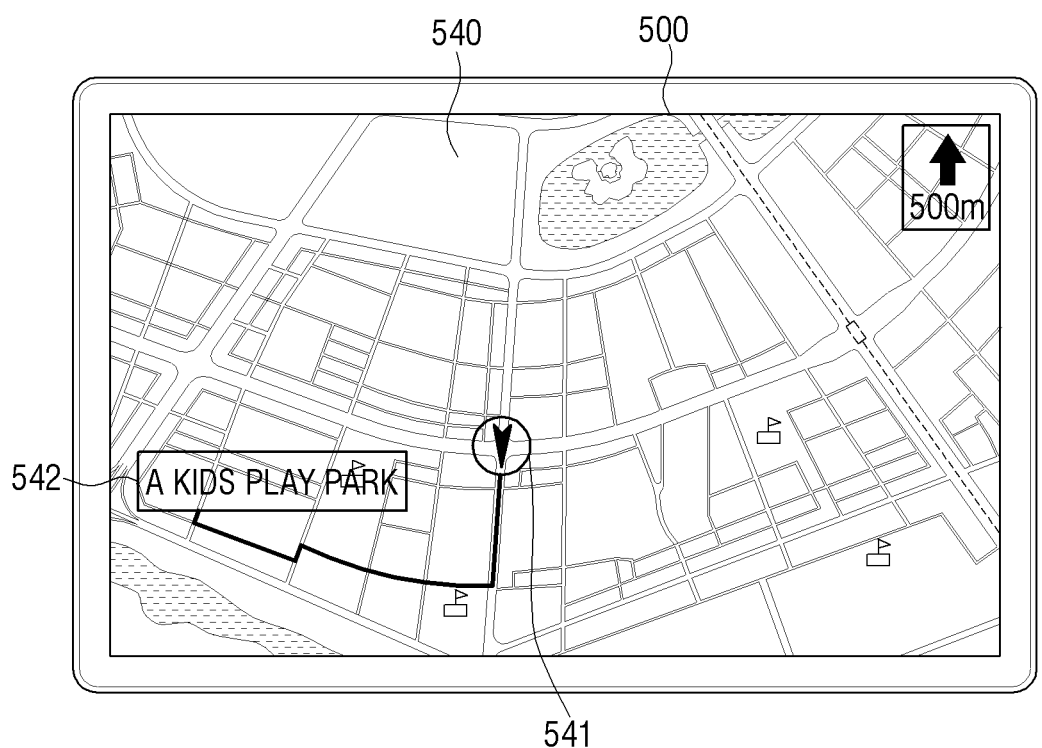

Meanwhile, the controlling unit 450 may display location information received from the user terminal device 300 on the navigation map, and may provide route guidance to a certain location by selection of the user. For example, as shown in FIG. 9, the navigation map 530 may display park A 531 and train station C 532 based on information received from the user terminal device 300. If the user selects park A, the navigation screen 540, in which a route from a present location 541 to park A 542 is set, as in FIG. 10, may be displayed in the displaying unit 500.

Meanwhile, the controlling unit 450 may modify a currently set route by using received location information, if location information is received from the user terminal device 300 in the state that a present route is set. Specifically, the controlling unit 450 may display received location information on the navigation map, in which route from present location to certain location is set, and may reset or modify the route on the navigation map to include location information that the user has selected. That is, the controlling unit 450 may use location information as a stopover in a currently set route.

Figure 11:
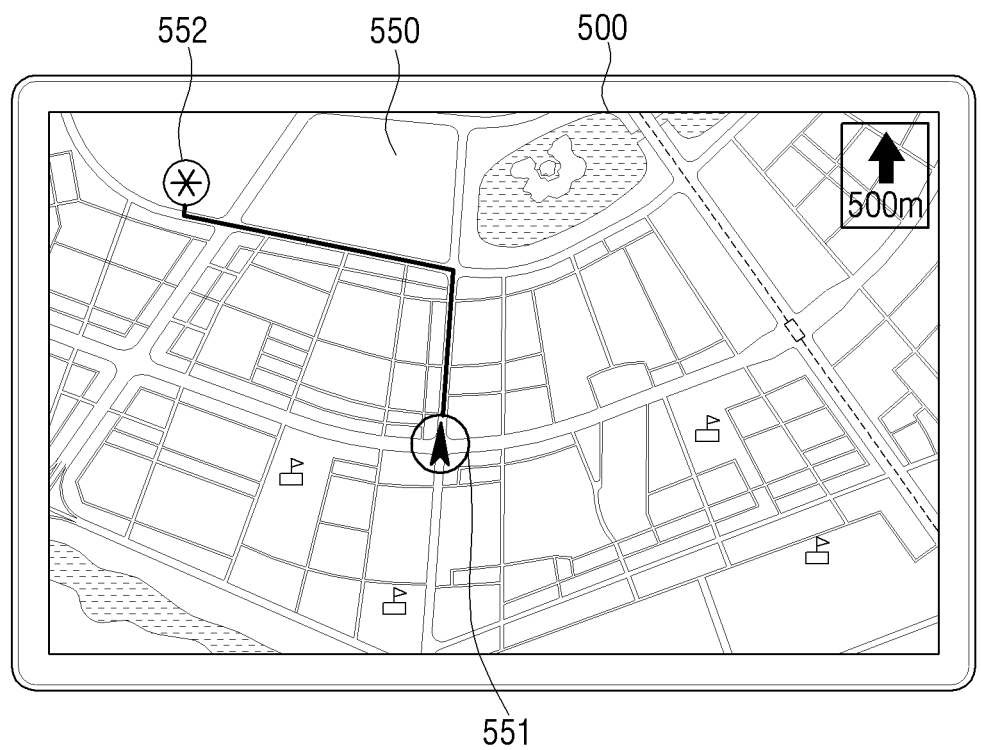
Figure 12:
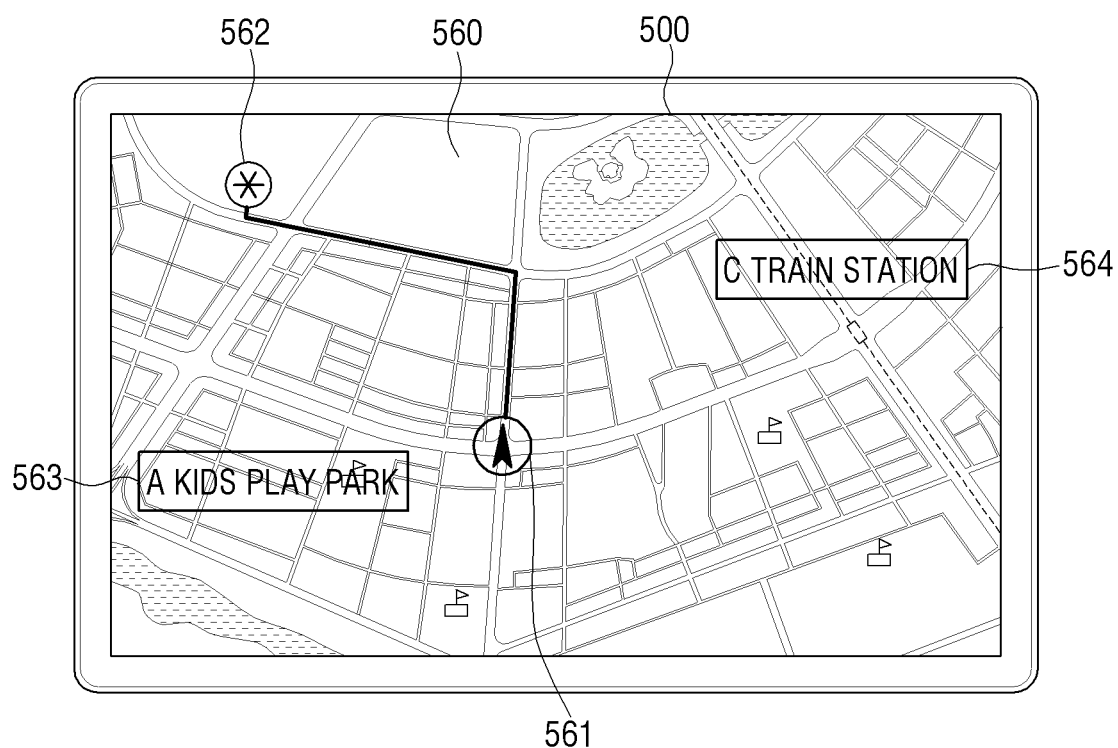

For example, as shown in FIG. 11, the navigation map 550, in which route from a present location 551 to destination location 552 that a user has predetermined, is set and displayed on the displaying unit 500. In this case, when the location information is received from the user terminal device 300, park A 563 and train station C 564 are displayed on the navigation map 561 along with the route, as shown in FIG. 12.

Figure 13:
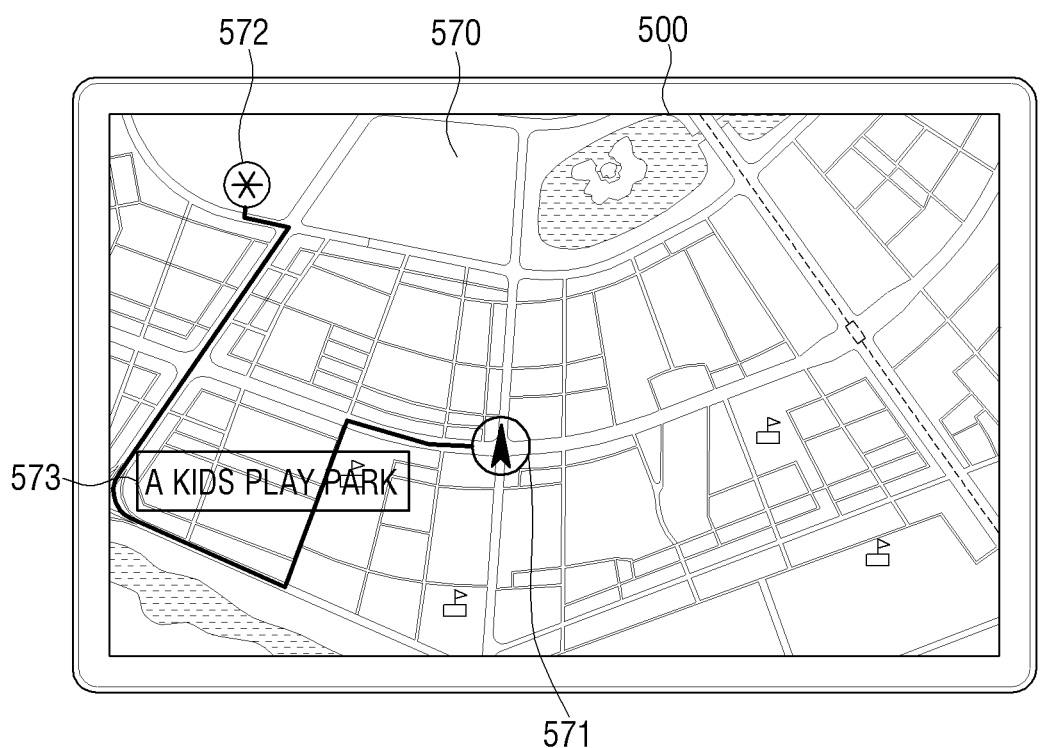

Later, if the user selects park A 573, the navigation map 570, in which the route from the present location 571 to the location 572 that the user has predetermined, may be displayed on the displaying unit 500 by modifying the currently set route to stop at park A 573, as shown in FIG. 13.

Meanwhile, the controlling unit 450 may display the information, if the navigation device 400 is within a predetermined distance from the location information received from the user terminal device 300 while traveling along the currently set route. The predetermined distance may be set and modified by the user.

The controlling unit 450 may reset a currently set route may so that the user may stop at the received location information according to the selection of the user.

Figure 14:
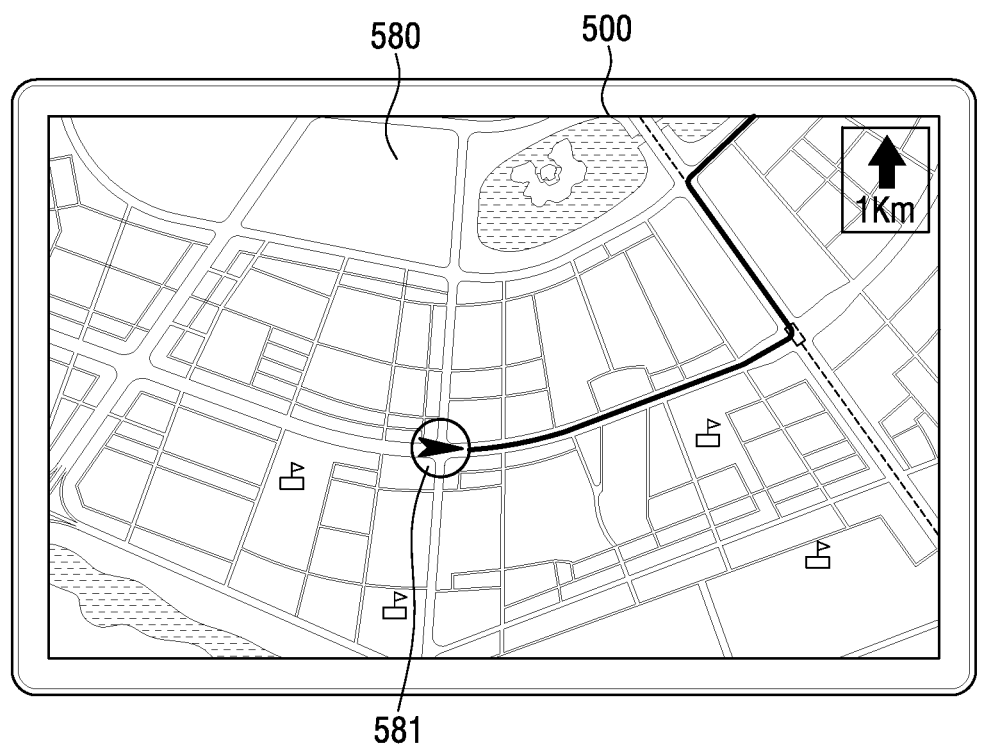

For example, as shown in FIG. 14, the navigation screen 580, in which the route from present location 581 to certain location is set, is displayed on the displaying unit 500, and location information on train station C received from the user terminal device 300 is stored in the storing unit 410.

Figure 15:
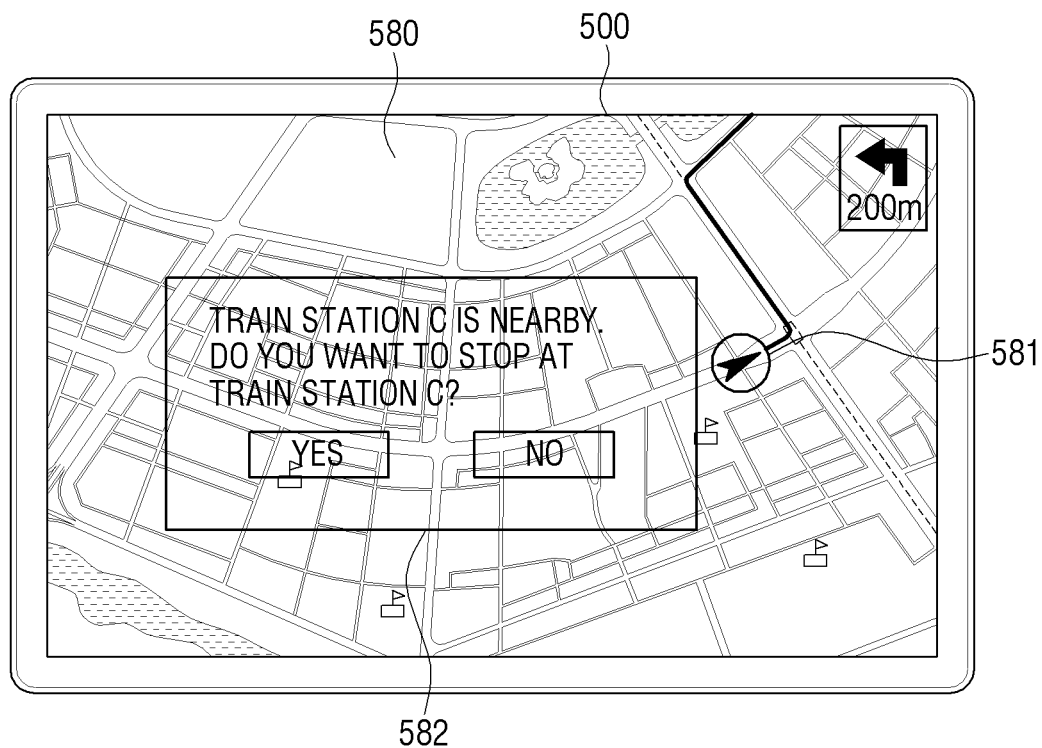
Figure 16:
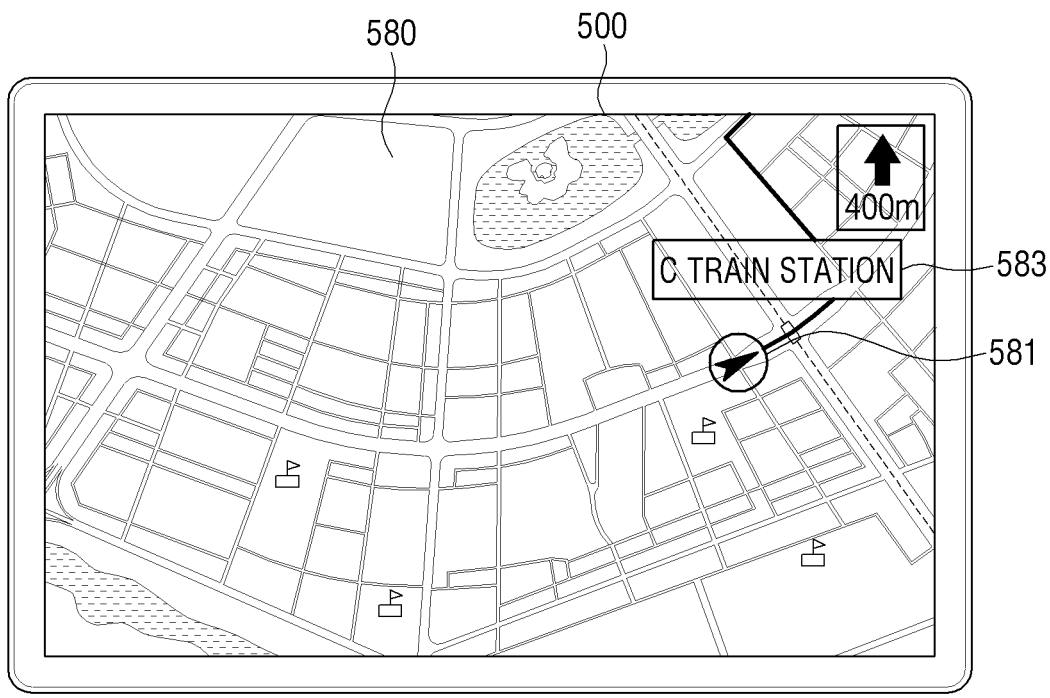

Later, as shown in FIG. 15, if the location 581 that the user has traveled along the route is close to train station C, the navigation device may display the message 582 asking whether the user would like to stop at train station C on the displaying unit 500. If the user chooses to stop, the route may be modified from the currently set route to stop C train station C 583 on the navigation map 580, as shown in FIG. 16.

In the exemplary embodiment described above, the user terminal device 300 transmits location information to the navigation device 400, and that the navigation device 400 uses the received location information to set the route, but this is only one example. That is, if the user terminal device 300 provides a route guidance function, the user terminal device 300 may extract the location information from the obtained data and may use the extracted location information to provide the route guidance function. As such, the user terminal device 300 may be implemented as the navigation device or an application for providing the route guidance function may be installed on the user terminal device 300.

In this case, the user terminal device 300 may further include a location searching unit (not illustrated) for judging a location of the user terminal device 300 and a displaying unit (not illustrated) for displaying navigation map, and the navigation map may be stored in a storing unit 320.

Meanwhile, since each structure of the user terminal device 300 may perform the same function as each structure of the navigation device 400 described in FIGS. 6 to 16, redundant description of these structures will be omitted for brevity.

Figure 17:
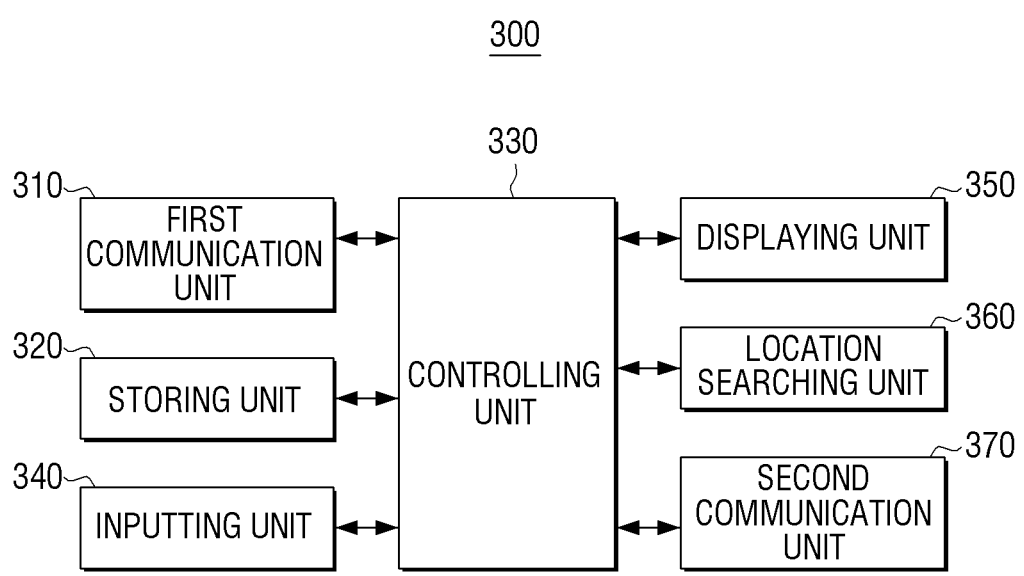
FIG. 17 is a view for describing a detail structure of a user terminal device in accordance with an exemplary embodiment.

FIG. 17 is a view for describing a structure of the user terminal device in accordance with an exemplary embodiment. As shown in FIG. 17, a user terminal device 300 includes a first communication unit 310, a storing unit 320, a controlling unit 330, an inputting unit 340, a displaying unit 350, a location searching unit 360, and a second communication unit 370. In describing FIG. 17, similarly labeled structures perform similar functions to those in FIG. 4.

The inputting unit 340 may include various user interface input means, such as a touch screen, a touch pad, a button, a remote control signal interface, a keyboard, a mouse, and a joystick. Thus, the inputting unit 340 receives user input and transmits the input to the controlling unit 330.

The controlling unit 330 performs an operation corresponding to the user input received through the inputting unit 340. The controlling unit 330 includes a system memory, a main CPU, an image processor and interfaces connected to each structure of user terminal device 300. A specific structure of the controlling unit 330 is described later.

The controlling unit 330 may display a graphical user interface (GUI) on a screen in which a name of each device is listed using the name of each device stored in the storing unit 320. That is, the displaying unit 350 may display a list on the device and the controlling unit 330 may determine the device selected on the list as the other device to which information is to be provided.

Meanwhile, the controlling unit 330 searches whether a nearby device exists using the first communication unit 310 in response to receiving a user input to establish a communication connection with a nearby device, and establishes communication with a searched device. If a plurality of nearby devices is determined, the controlling unit 330 may display name of a device received in searching process and a device identification icon in the displaying unit 350 and a device for establishing communication may be selected by the user. Through this process, the controlling unit 330 may determine an external device as the device to which information is to be provided if the first communication unit 310 establishes communication with an external device.

The location searching unit 360 searches for a location of the user terminal device 300.

Specifically, the location searching unit 360 may prepare a GPS module, and search for a location using a GPS signal. The GPS module receives the signal transmitted from a plurality of GPS satellites and calculates distances between the satellites and the user terminal device 300 by using time differences between transmission times and reception times. Also, the GPS module may calculate a location of the user terminal device 300 with triangulation by considering an overall distance calculated among each of a plurality of satellites and the locations of the satellites.

Meanwhile, the controlling unit 330 may calculate a location of the user terminal device 300 every time the first communication unit 310 obtains data from an external device, using the location searching unit 360, and may store the calculated location in the storing unit 320 by mapping calculated location with each obtained data.

The controlling unit 330 may extract information usable by the another device depending on the function of the other device, when determining the device to which information is provided. In particular, the controlling unit 330 may extract different information depending on the various situation of the user terminal device 300.

As an example, the controlling unit 330 may extract information usable by the other device from the stored data by considering a location at which data is obtained.

Figure 18:
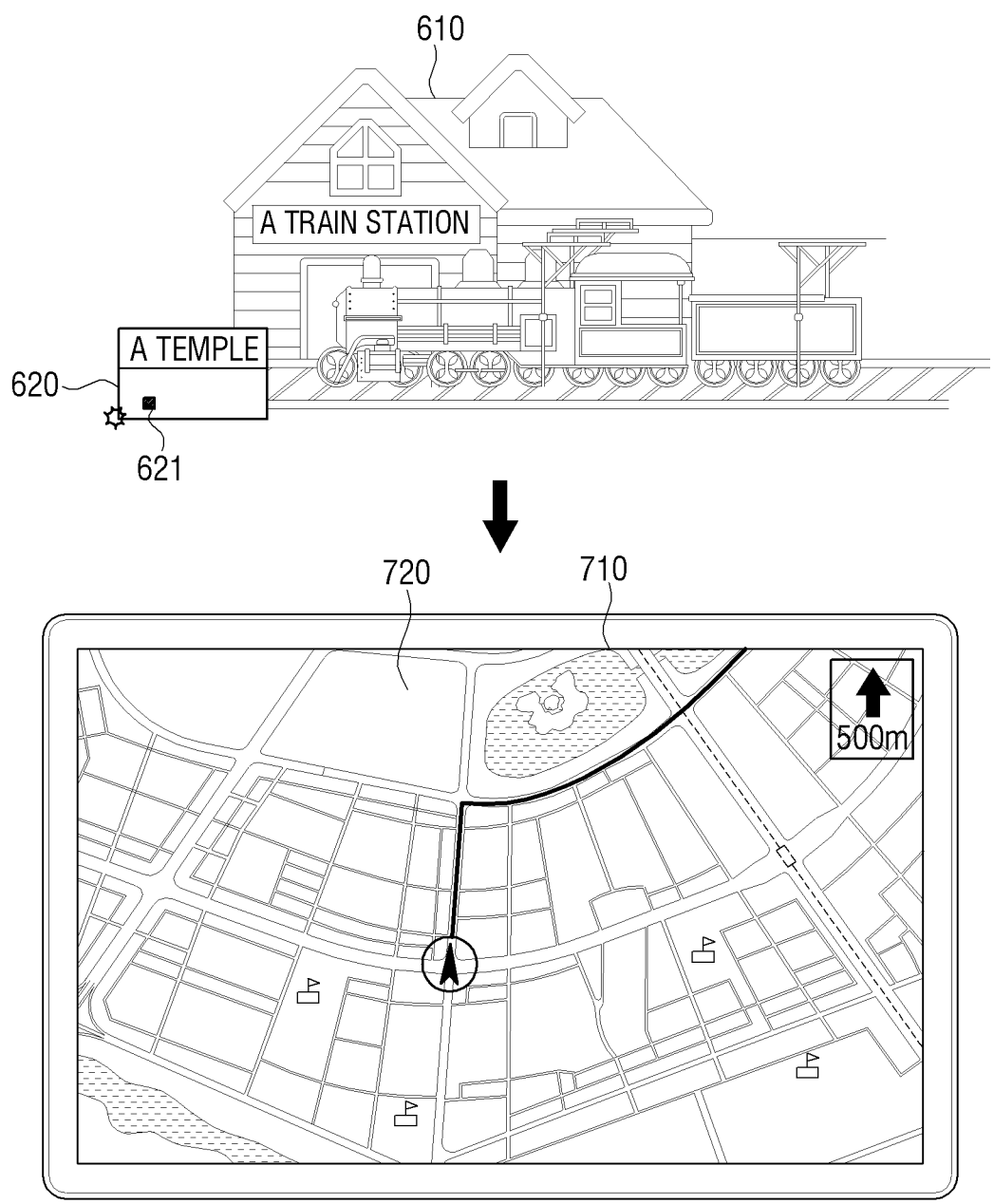
FIGS. 18 and 19 are views for describing a method of extracting information according to the location where data is obtained in accordance with an exemplary embodiment.
Figure 19:
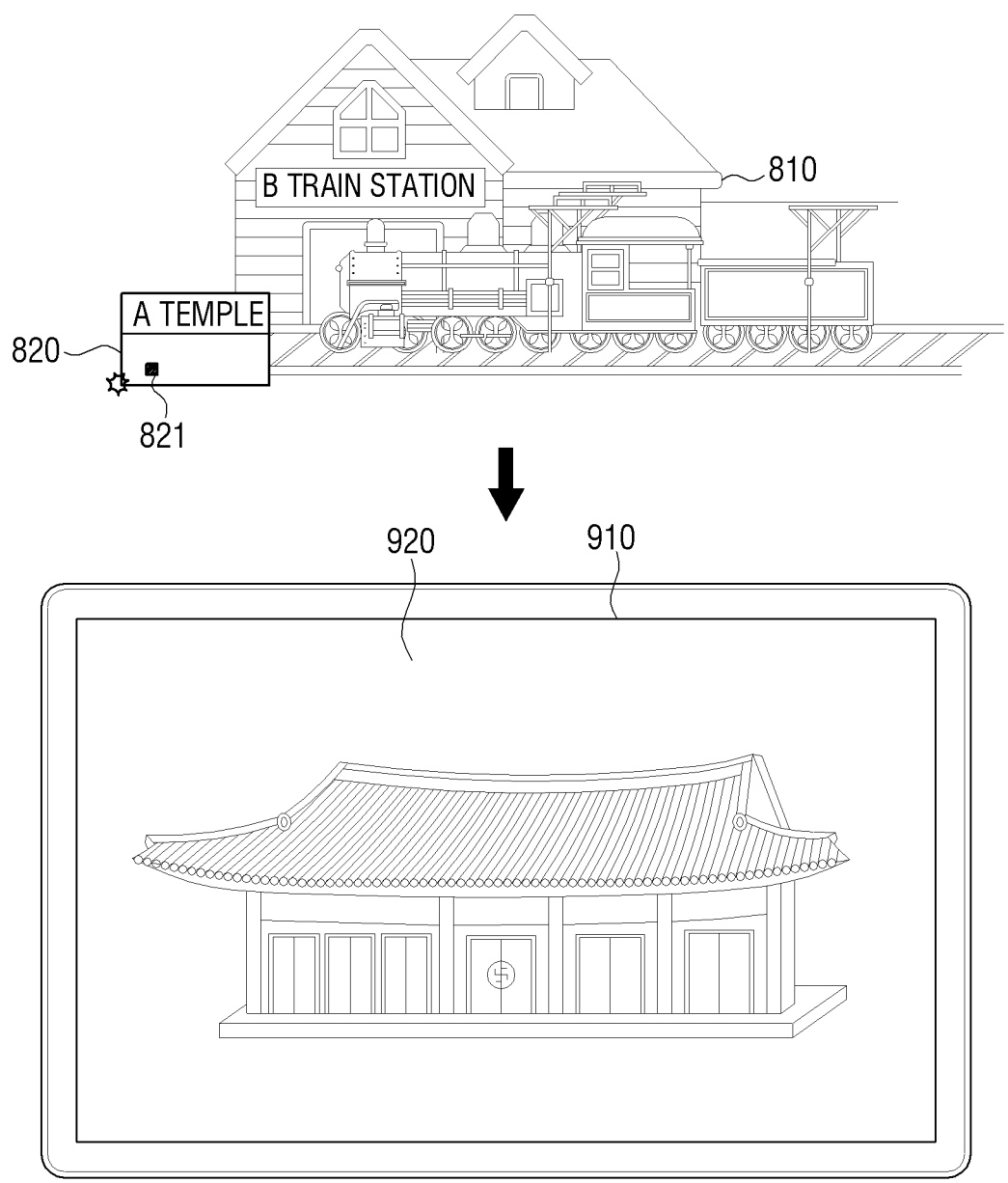

FIGS. 18 and 19 are views for describing a method of extracting information according to the location at which data is obtained in accordance with an exemplary embodiment. In FIGS. 18 and 19, it is assumed for convenience of the description that the other device is a navigation device that may perform a route guidance function.

The controlling unit 330 may extract location information from stored data if the location at which data is obtained and the present location of the user terminal device 300 are within a predetermined distance, and additional information may be extracted from the stored data if the location at which data is obtained and the present location of the user terminal device 300 exceed the predetermined distance.

Here, the additional information may be information usable for a sub function of the other device, and not a main function of the other device. For example, if the device is a navigation device for performing a route guidance function, the main function may be a route guidance function. Meanwhile, the sub function may be an image display function in which the navigation device may display images.

Meanwhile, a predetermined boundary may be set and modified by the user, and may be stored in the storing unit 320 by inputted through the inputting unit 340.

For example, in FIG. 18, an advertisement flyer 620 of temple A is posted in train station A 610 and the user obtains data on temple A by near field-accessing an external object 621 attached to the advertisement flyer of temple A through the user terminal device 300.

Here, data on temple A may include an address, a place name, a brand name, hours of operation, a phone number, a history, an event schedule of temple A, images related to temple A, and a URL link address.

The controlling unit 330 judges whether a distance between the location of train station A 610, in which data on temple A is obtained, and the location of the present user terminal device 300 is within the predetermined distance. To implement this functionality, the controlling unit 330 may extract location information from the obtained data and may judge the location of temple A by using the location searching unit 350.

If the distance between the location of train station 610 A, in which advertisement flyer on temple A is posted, and temple A is within the predetermined distance as a result of a judgment, the controlling unit 330 judges that the purpose of the user is to reach temple A.

The controlling unit 330 extracts location information, such as an address, a place name, a brand name, a phone number of temple A from data on temple A, and transmits the location information to the navigation device 710. Meanwhile, for transmitting the location information to the navigation device 710, the first communication unit 310 may be near field-accessed with a near field communication reader attached in the door of a vehicle in which a navigation device is equipped, or may directly be near field-accessed with the navigation device in which the near field communication reader is attached.

Meanwhile, a route guidance function may be performed by using location information transmitted from the user terminal device 300 in the navigation device 710. Specifically, as shown in FIG. 18, the navigation device 710 may judge a location of temple A by using location information of temple A transmitted from the user terminal device 300, and may display the location of temple A on the navigation map screen 720 in which route searched from present location to location of temple A is displayed.

FIG. 19 illustrates a case that the advertisement flyer on temple A 820 is attached in train station B 810 and that the user obtained data on temple A by tagging an external object 821 attached to the advertisement flyer on temple A through the user terminal device 300. The information included in data on temple A is the same as in FIG. 18.

The controlling unit 330 judges whether distance between the location of train station B 810 at which data on temple A is obtained and the location of present user terminal device 300 is within the predetermined distance.

If the distance between the location of train station B 810, in which advertisement flyer on temple A is posted, and temple A exceeds the predetermined distance as a result of a judgment, the controlling unit 330 determines that the purpose of the user is to obtain information on temple A, and not to reach temple A.

The controlling unit 330 extracts information usable in a sub function in the navigation device, such as images related to temple A from data on temple A and transmits the information to the navigation device 910.

Though, the exemplary embodiment above describes the sub function of the navigation device is an image display function, this is only one example. Alternatively, the navigation device may be connected to the Internet, and the user terminal device 300 may extract a URL link address based on the obtained data and transmit the URL link address to the navigation device, and the navigation device could provide additional information regarding the obtained data.

Figure 20:
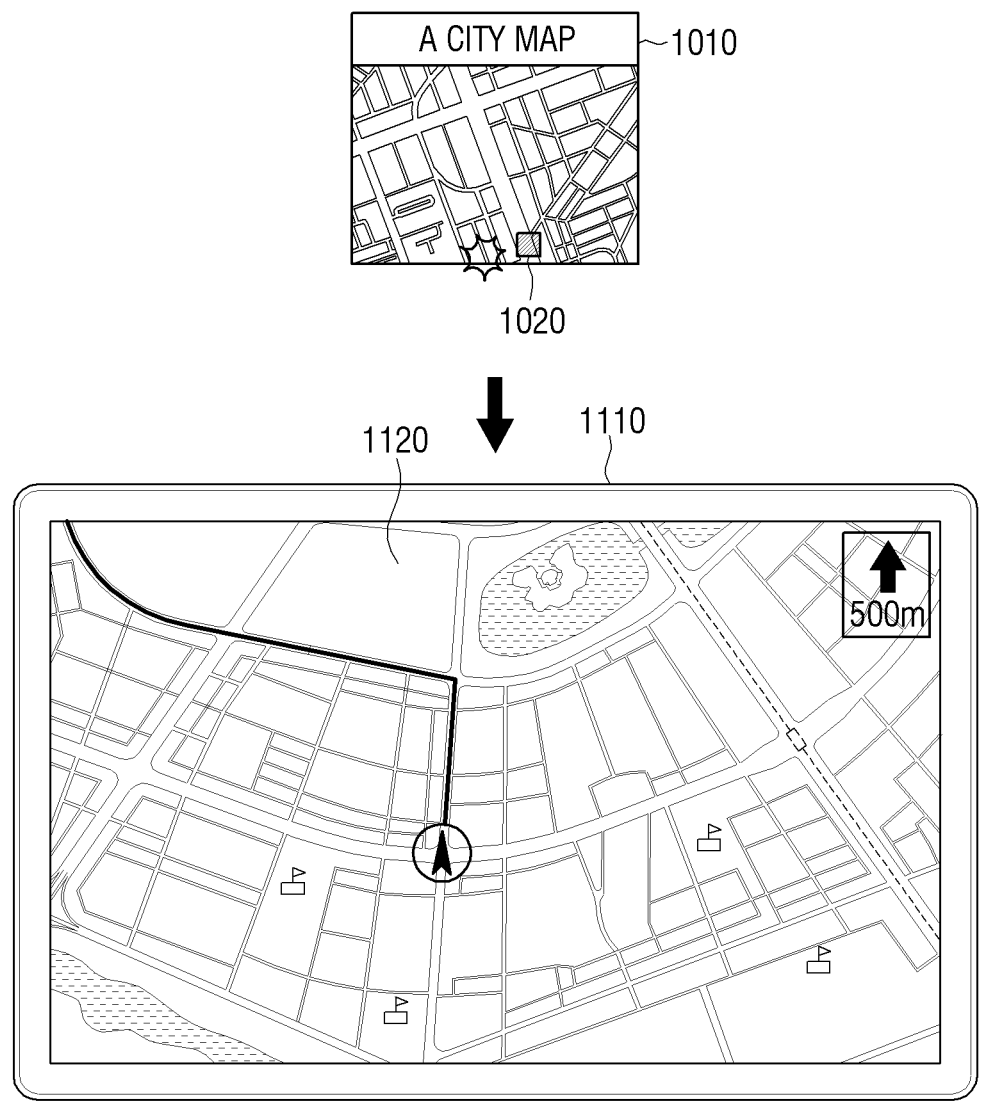
FIGS. 20 and 21 are views for describing a method of extracting information according to the location where data is obtained in accordance with an exemplary embodiment.
Figure 21:
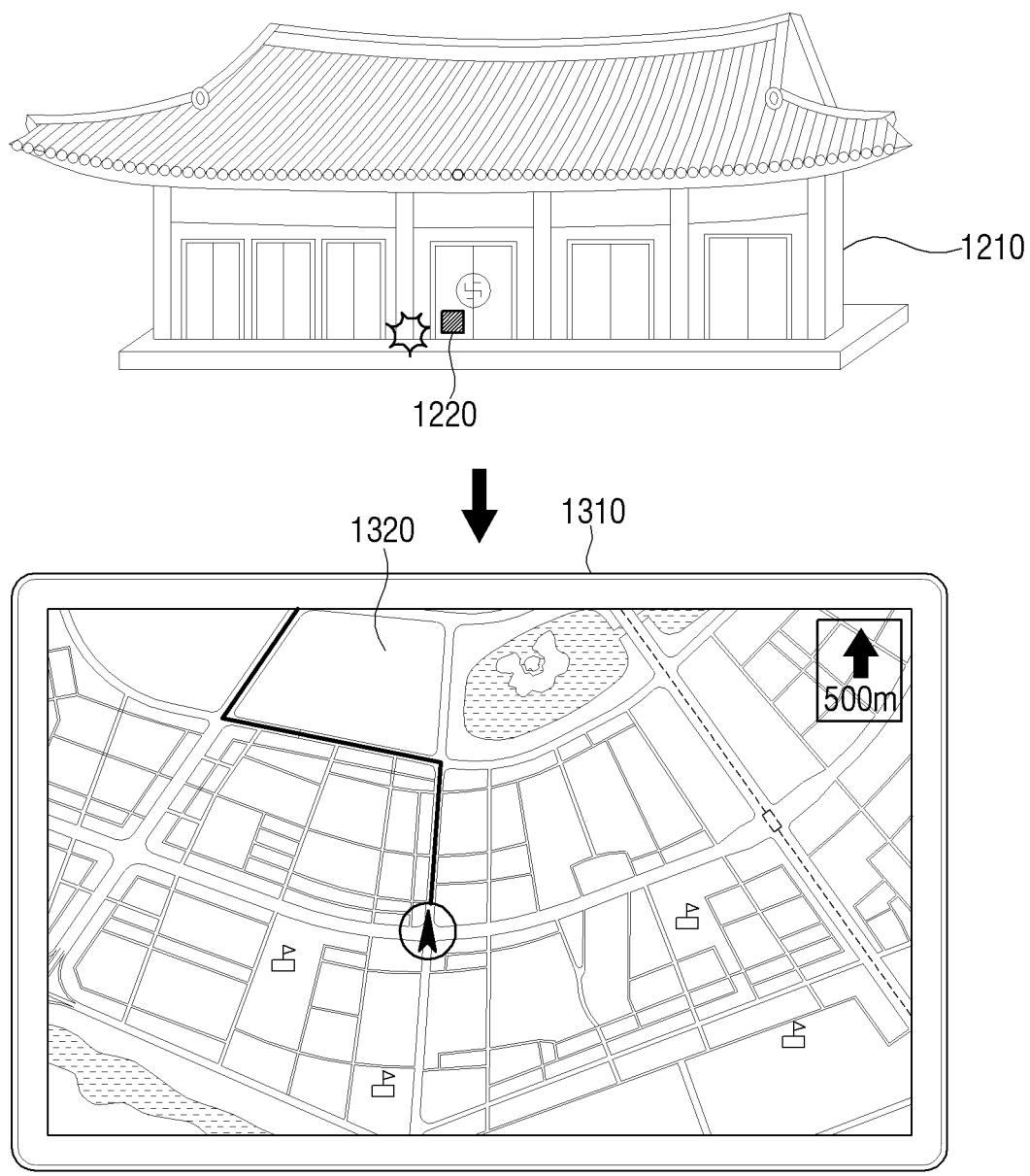

FIGS. 20 and 21 are views for describing a method of extracting information according to the location in which data is obtained in accordance with the an exemplary embodiment. In FIGS. 20 and 21, it is assumed for convenience of the description that the device is a navigation device that may perform route guidance function.

The controlling unit 330 may extract the main location information from the stored data when both a location at which data is obtained and the present location of the user terminal device 300 exceed the predetermined distance, or extract sub location information from the stored data when both location at which the data is obtained and the present location of the user terminal device are within the predetermined distance.

The predetermined distance may be set by the user, and may be stored in the storing unit by input through the inputting unit 340.

The main location information may be location information related to a certain place among location information included in obtained data, and the sub location information may be location information related to nearby facilities among location information included in the obtained data.

For example, data is obtained from an external object attached in museum A. In this case, an address of museum A, the hours of operation, a phone number, a history, an admission fee, an event schedule, images related to museum A, a URL link address, an address of restaurants near museum (or parking lot, tourist attraction), a brand name, and hours of operation may be included in the obtained data. In such case, the main location information may be an address of museum A and a phone number, which are location information related to museum A, and the sub location information may be an address of restaurant near museum A, and a brand name.

FIG. 20 illustrates a scenario in which an external object 1020 is attached on a map 1010. The external object stores data about temple A. The user obtains the data on temple A by near field communication with the external object 1020.

The data obtained from the external object 1020 on the map 1010 may include an address of temple A, hours of operation, a phone number, a history, an admission fee, an event schedule, images related to A temple, a URL link address, an address of restaurants near A temple, a brand name, and hours of operation.

The controlling unit 330 judges whether the distance between the location of temple A and the location of the user terminal device 300 at which the user terminal device 300 reads the external object 1020 is within the predetermined distance. For this, the controlling unit 330 may extract location information from obtained data and may judge the location of temple A by using location searching unit 350.

If the distance between the location of temple A and the location of the user terminal device 300, which is the location at which the user terminal device 300 obtains the data from the external object, exceeds the predetermined distance, the controlling unit 330 judges that the purpose of the user obtaining the data from the external object 1020 is to reach A temple. Thus, the controlling unit 330 extracts location information usable by the route guidance function in the navigation device, such as an address of temple A and phone number from data on temple A, and transmits the location information to the navigation device 1110. The navigation device may automatically perform route guidance function by using the location information transmitted from the user terminal device 300. Specifically, like FIG. 15, the navigation device 1110 may judge a location of temple A by using the location information of temple A transmitted from the user terminal device 300, and may display the navigation map screen 1120 in which a route from present location to location of temple A is displayed.

FIG. 21 illustrates a scenario in which the user obtains data about temple A through near field communication with an external object 1220 at the location of temple A 1210.

The controlling unit 330 judges whether the distance between the location of temple A and the location of the user terminal device 300 is within the predetermined distance.

If the distance between the location of temple A and the location of the user terminal device, which is the location at which the user terminal device 300 obtains the data from the external object 1220, is within the predetermined distance, the controlling unit 300 judges that the user is already at the location of the temple A and the user may want to go to another place related to temple A. Thus, the controlling unit 330 extracts the sub location information, such as an address of a restaurant near temple A, from data on temple A and transmits the sub location information to the navigation device.

Meanwhile, the navigation device may automatically perform the route guidance function by using location information transmitted from the user terminal device 300. Specifically, like FIG. 21, the navigation device 1310 may judge location of a restaurant near temple A by using location information of the restaurant near temple A transmitted from the user terminal device 300, and may display the route to the location of the restaurant near A temple on a navigation map 1320.

Meanwhile, the controlling unit 330 may extract information usable by the device from the stored data based on the time that the device for providing information is determined.

Figure 22:
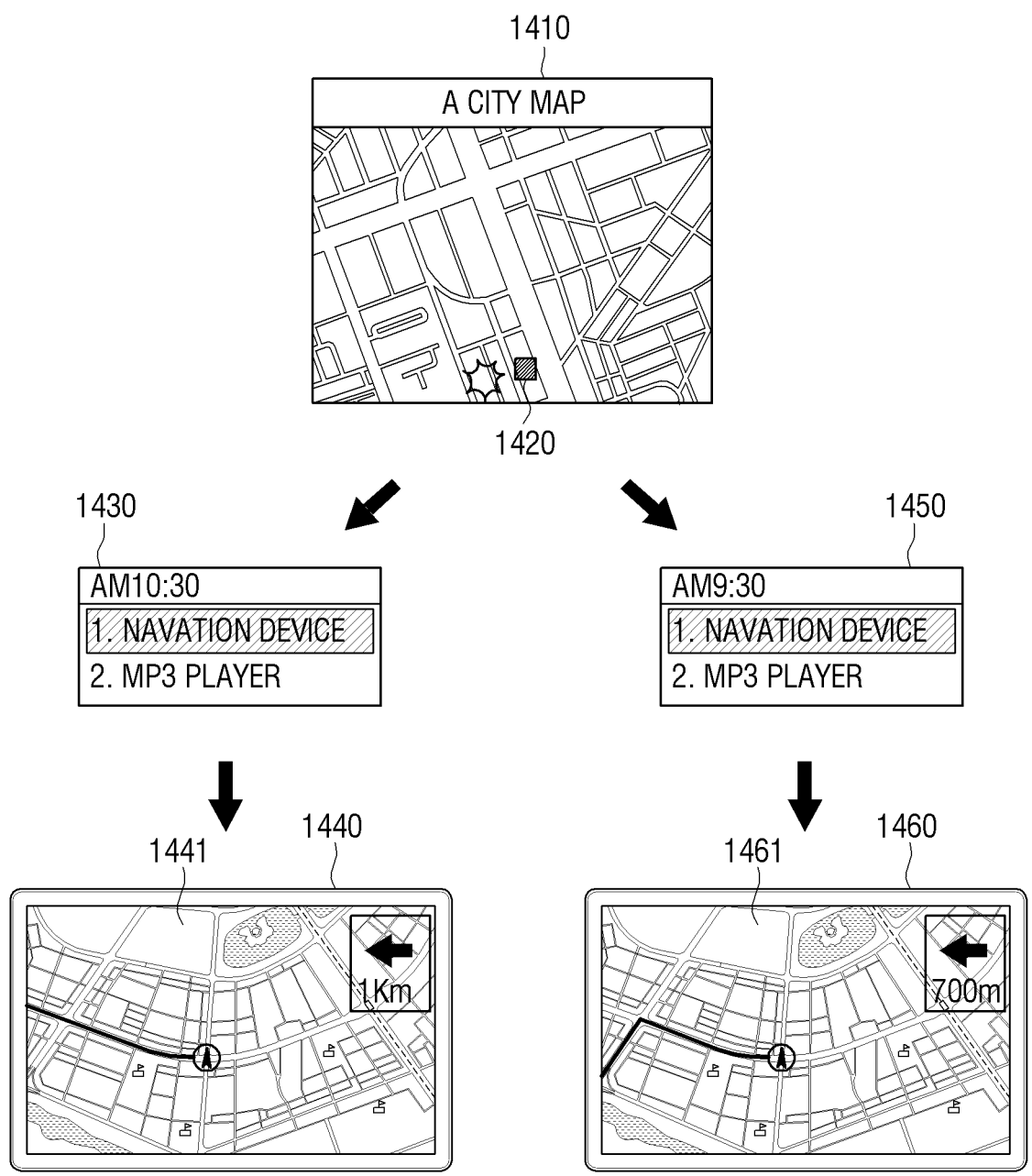
FIG. 22 is a view for describing a method of extracting information according to the time that the other device for providing information is determined in accordance with an exemplary embodiment.

FIG. 22 is a view for describing a method of extracting information according to the time that the device to which information to be provided is determined in accordance with an exemplary embodiment. For convenience of the description, the device is a navigation device that may perform route guidance function.

The controlling unit 330 may extract main location information from the stored data if the time that the device to which information is to be provided is determined is included in the time information included in stored data, and may extract a sub location information from the stored data if the time that the device to which information to be provided is determined is not included in the time information included in stored data.

In this case, the main location information is location information related to a certain place among location information included in the obtained data, and the sub location information is location information related to nearby facilities among location information included in the obtained data.

Meanwhile, the time that the device to which information is to be provided is determined may be the time that the user selects a certain device on the displaying unit 350 or that the user performs communication connection with the other device.

FIG. 22 is the case that the external object 1420 is attached in the location of park A on the map 1410, and that the user terminal device 300 obtained data on park A through near field-accessing the external object 1420 on the map 1410.

Data obtained from the external object 1420 attached on the map 1410 may include an address of park A, hours of operation, a phone number, an admission fee, images related to park A, a URL link address, an address of a restaurant near park A, a brand name, and hours of operation.

Later, if the user selects, "1 Navigation device" on a UI screen 1020, in which a list on the device is displayed, the controlling unit 330 extracts information usable by a route guidance function depending on the function performed in the navigation device from the obtained data.

In this case, the controlling unit 330 judges whether a current time is included in the time information of the obtained data by extracting an operation time information for park A from the obtained data and comparing the current time to the operation time information.

If the current time is within the operation time, for example the extracted operation time on park A is from 10 A.M. to 8 P.M. and the current time is 10:30, the controlling unit 330 extracts location information on park A, such as an address of park A, and a phone number from the obtained data, and transmits the location information to the navigation device 1440. In other words, if the park A is currently open, then the user may be directed to the park A.

The navigation device 1440 may automatically perform the route guidance function using the location information transmitted from the user terminal device 300. Specifically, the navigation device 1440 may judge location of park A by using the location information of park A transmitted from the user terminal device 300, and may display the route from present location to the location of park A on a navigation map 1441.

The time that the user selected "1 Navigation device" on a UI screen 1450 is 9:30, the controlling unit 330 judges that the current time is not within the time information included in obtained data.

In this case, the controlling unit 330 extracts the location information on restaurant near park A, such as an address of restaurant near park A, and a brand name from the obtained data and transmits the location information to the navigation device. Thus, the navigation device 1460 may judge location of a restaurant near park A by using location information of restaurant near park A transmitted from the user terminal device 300, and may display the route from a present location to the location of restaurant near park A on a navigation map 1461. In other words, if the park A is closed, then the user may be directed to the an alternate location near the park A.

Meanwhile, in terms of extracting sub location information, the controlling unit 330 may also consider the current time. That is, the controlling unit 330 may extract information for the sub location and determine whether the current time is within an operation time of the sub location.

The time described above may be a current time at which a user selects the device to which information is to be transmitted, as from the menus 1430 and 1450. Alternatively, the time may be the time at which information is obtained from an external source and the device is determined.

In addition, the exemplary embodiment above describes that information is extracted depending on whether the time is within the time information included in stored data, but this is only one example.

The controlling unit 330 may extract the main location information from the stored data if the time is within a predetermined range from the time information. For example, the predetermined range may be a time spent when traveling with a vehicle from a present location of the user terminal device 300 to a main location extracted from the obtained data.

In the exemplary embodiment above, if it takes 1 hour to drive from the present user terminal device 300 location to park A, though the time may be determined to be 9:30 and the park does not open until 10:30, the controlling unit 330 may not extract the location information on restaurant near park A, but may extract the location information on park A from the stored data, predicting a user's arrival at the park opening time of 10:30.

Meanwhile, the controlling unit 330 may extract information usable by the device from the stored data considering a kind of network used in communication between the first communication unit 310 and the device. Here, the kind of network used in communication between the first communication unit 310 and the device may include NFC, Zigbee, WiFi, or Bluetooth.

Specifically, the controlling unit 320 may extract information having a size that may be supported by the transmission rate of communication method.

For example, it is assumed that the device is a navigation device having the main function of route guidance function and the sub function of image display function, and that the first communication unit 310 and the navigation device perform communication according to NFC or Bluetooth.

If the first communication unit 310 and the navigation device perform communication according to NFC, data of smaller size may be transmitted, so the controlling unit 320 may extract location information in text form among information included in stored data.

On the other hand, if the first communication unit 310 and the navigation device perform communication according to Bluetooth, data of larger size may be transmitted, so the controlling unit 320 may extract image information among information included in the stored data.

Meanwhile, the exemplary embodiment above describes NFC and Bluetooth, but this is only one example, and wireless communication may also be performed using Zigbee and WiFi. Meanwhile, the controlling unit 330 may display a UI screen for selecting at least one of information from extracted information on the displaying unit 350, and may control the first communication unit 310 to provide information selected with a UI to the device. FIGS.

FIGS. 23 to 26 are views for describing methods of selecting information on a UI screen in accordance with an exemplary embodiment. For convenience of the description, the device is a navigation device that may perform route guidance function.

The controlling unit 330 extracts location information usable by the navigation device if various information on a certain place is obtained from a plurality of external objects. The controlling unit 330 may display a map in which the extracted location information is displayed in the displaying unit 320 in response to a user input, and the map may be stored in the storing unit 320.

Figure 23:
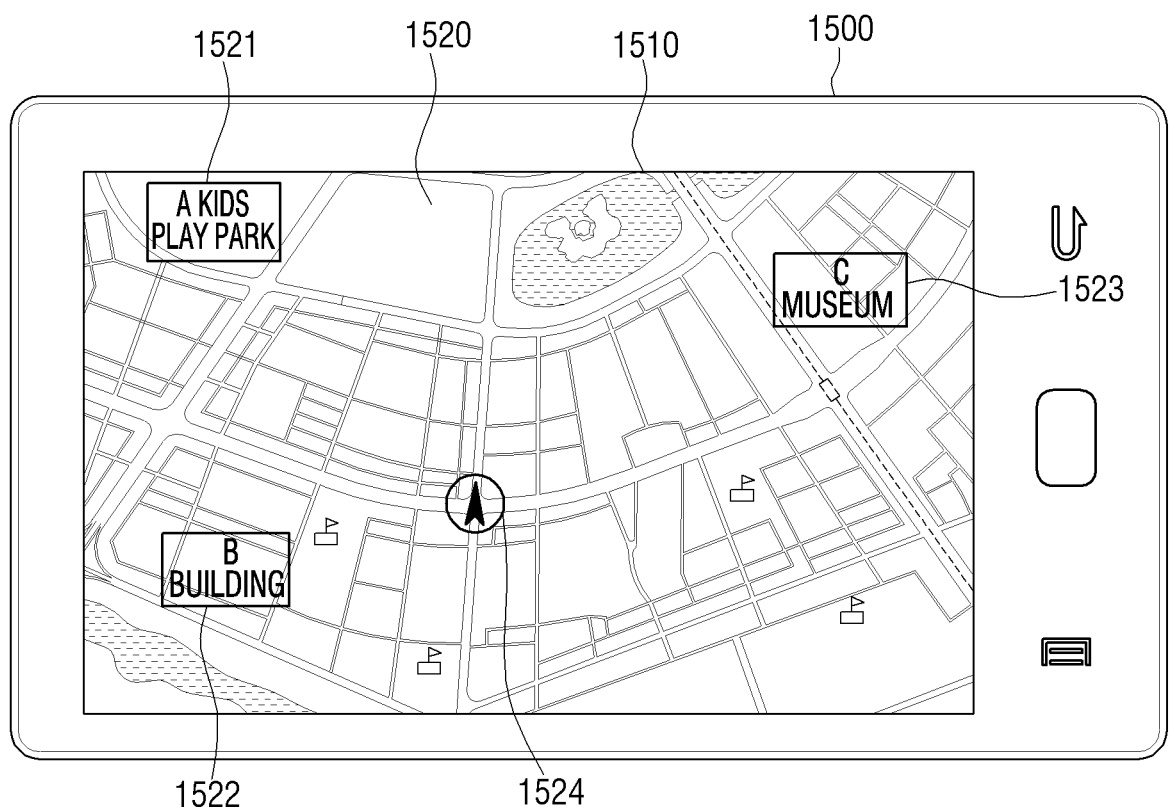
FIGS. 23-26 are views for explaining methods of selecting information on a UI screen in accordance with an exemplary embodiment.

Specifically, like FIG. 23, a user terminal device 1500 may display a map 1520 in which extracted location information (1521-1523) is displayed in a displaying unit 1510. For example, a graphic element for indicating a location of park A 1521, a graphic element for indicating a location of building B 1522, and a graphic element for indicating a location of museum C 1523 may be displayed on the map 1520 with a graphic element for indicating a present location of a user terminal device 1524.

The controlling unit 330 may delete certain location information from the map displayed on the displaying unit 350 according to the user's input.

Figure 24:
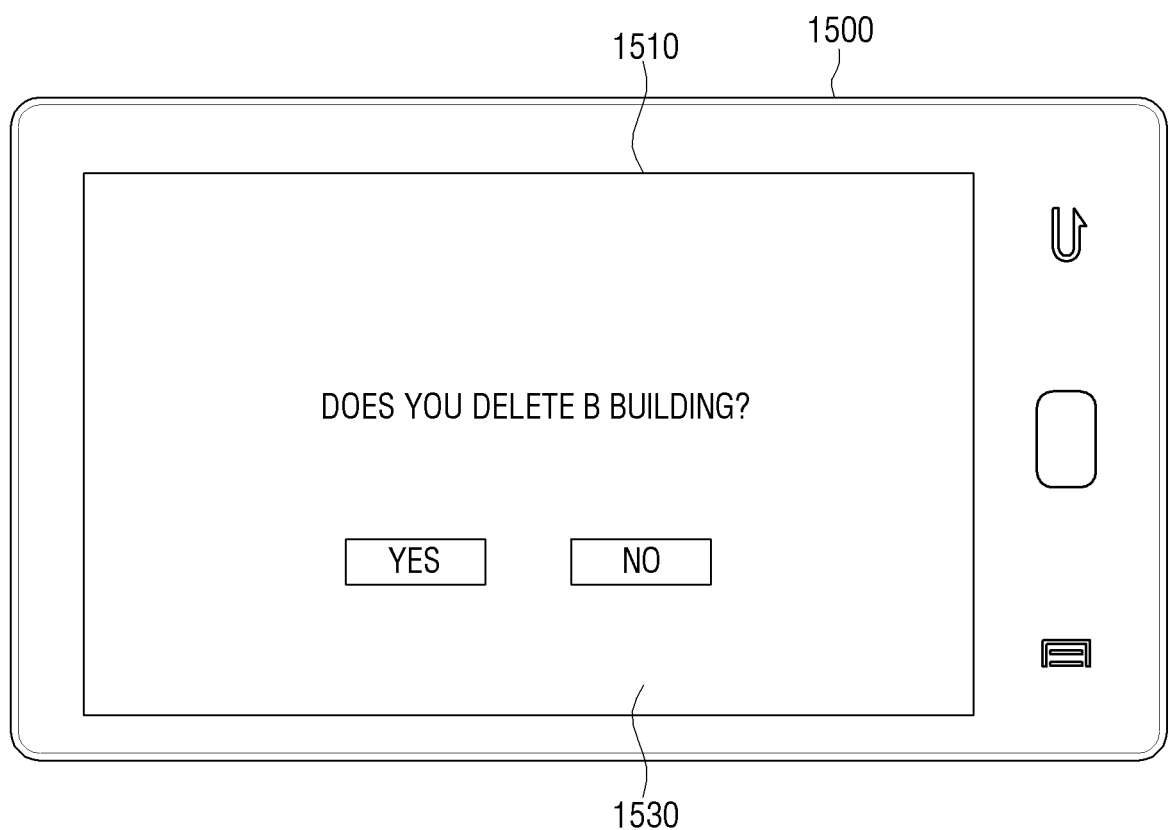

For example, when the user input for deleting building is B input, as in FIG. 24, the message 1530 asking for deletion of the graphic element for building B is displayed in the displaying unit 1510, and the graphic element for building B may be deleted according to the approval of the user.

In addition, the controlling unit 330 may set a route among certain location information displayed on the displaying unit 350 according to the user input.

Figure 25:
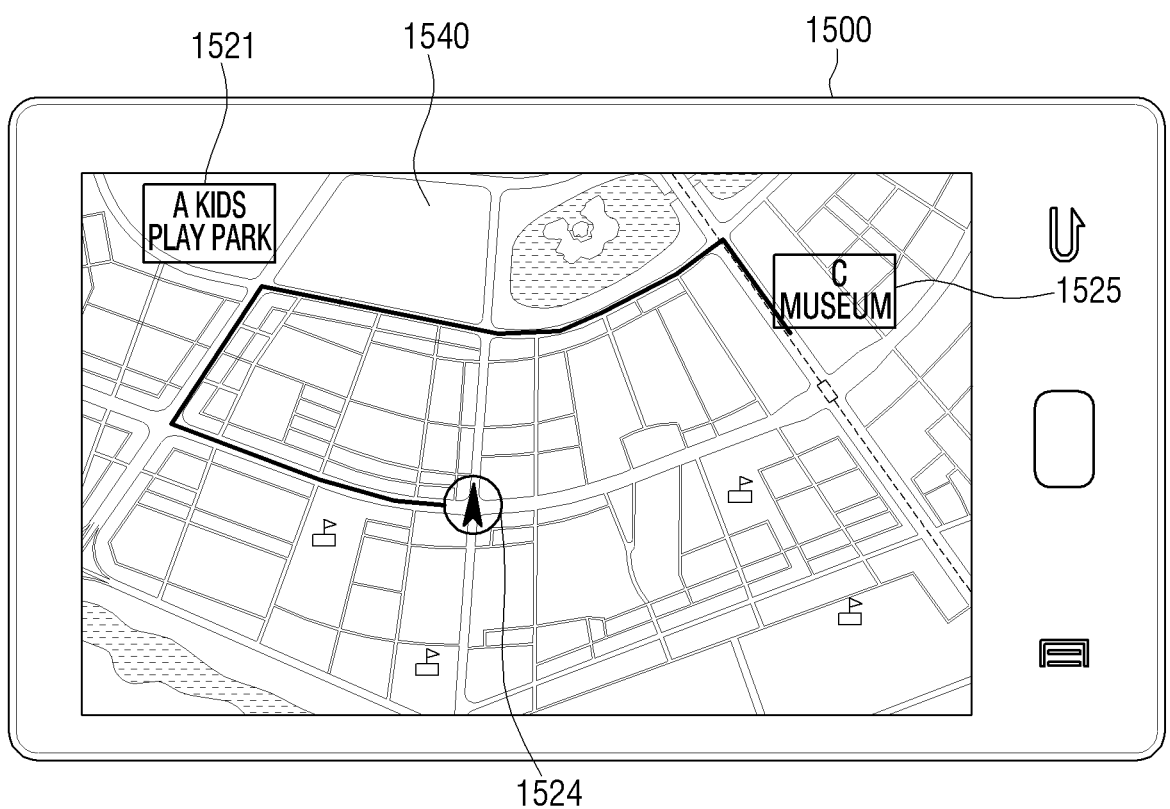

For example, as in FIG. 25, if the user selects graphic element 1521 for indicating a location of park A and graphic element 1523 for indicating a location of museum C on the map 1540, the route from a present location 1524 via park A to museum C may be set on the map 1540.

Figure 26:
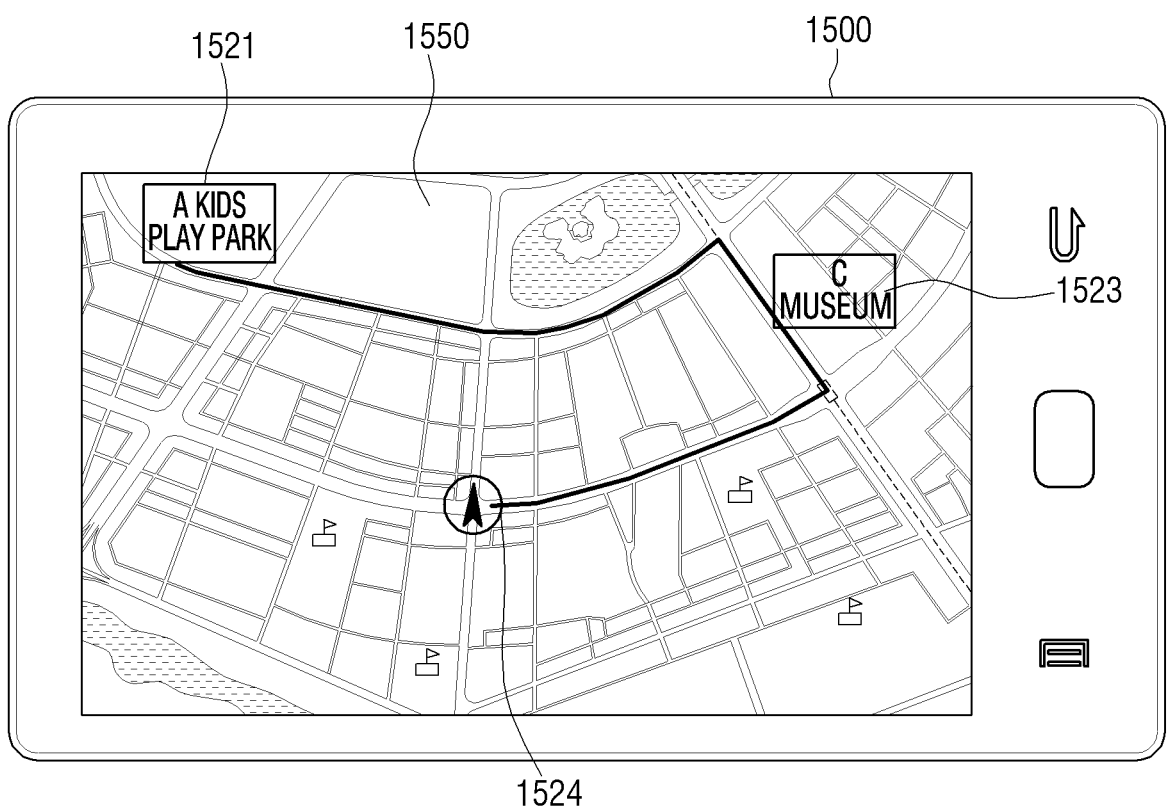

As another example, in FIG. 26, if the user selects a graphic element 1523 for indicating a location of museum C and a graphic element 1521 for indicating a location of park A, the route from a present location 1524 via museum C to park A may be set on the map 1550.

The navigation device may perform the route guidance function by using the extracted location information in which a location is deleted. In addition, if the user terminal device 300 may be realized as the navigation device or the user operates an installed navigation application, the user terminal device 300 may perform the guidance function.

Returning to FIG. 17, the second communication unit 370 performs the communication with a server (not illustrated). Specifically, the second communication unit 370 may access the server by preparing a network interface (not illustrated).

Meanwhile, the controlling unit 330 may control the second communication unit 370 to transmit the obtained data to the server and to receive information related to data obtained from the server. The related information may include information usable by the another device. The server may transmit the related information to the user terminal device 300 in response to receiving the information from the user terminal device 300. Meanwhile, the exemplary embodiment above describes that the server is external to the user terminal device 300, but this is only one example. That is, the server may be integrated in the user terminal device 300.

For example, it is assumed that the device performs the route guidance function and the data received from the first communication unit 310 includes information on supermarket A. In this case, the controlling unit 330 controls the second communication unit 370 so that the name of supermarket A is transmitted to the server from the obtained data. Thus, the server may search for information related to supermarket A and transmits the related information to the user terminal device 300. The information related to supermarket A may include location information on supermarket A branches in a geographic area, and the controlling unit 330 may transmit the location information received from the server to another device.

As another example, it is assumed that data received from the first communication unit 310 includes information on hamburger restaurant B. In this case, the controlling unit controls the second communication unit 370 so that the name of hamburger restaurant B is transmitted to the server. Thus, the server may search for the location information on hamburger B restaurant based on the name and transmits the location information to the user terminal device 300. The controlling unit 330 may transmit the location information on hamburger restaurant B to another device.

As still another example, it is assumed that data received from the first communication unit 310 includes information on museum C. In this case, the controlling unit controls the second communication unit 370 so that the name or location information of museum C is transmitted to the server. Thus, the server may search for location information on facilities near museum C, such as a restaurant, parking lot, and kids play park, and transmits the location information to the user terminal device 300. The controlling unit 330 may transmit the location information on facilities near museum C to another device.

Likewise, the user terminal device 300 may receive the location information related to obtained data through a linkage with the server, and may transmit the location information to another device.

In the above-described FIGS. 6 to 25, the device to which information is provided is illustrated as a navigation device, but this is only an example. That is, device may be realized as an electronic apparatus, such as a smart phone and a tablet, where an application program performing a route guidance function may be installed.

Returning to FIG. 3, it is described that the controlling unit 330 may extract information usable by the device from the stored data based on the characteristic of the device and may transmit the information to the device. In this case, the characteristic of the device may include the user information of the device, and the user information of the device may include at least one of preference information, age, hobby, and sex.

First, a method of extracting information usable by the device based on the preference information may be described.

The preference information may be differently obtained depending on whether the user of the user terminal device 300 and the user of the other device are same.

Figure 27:
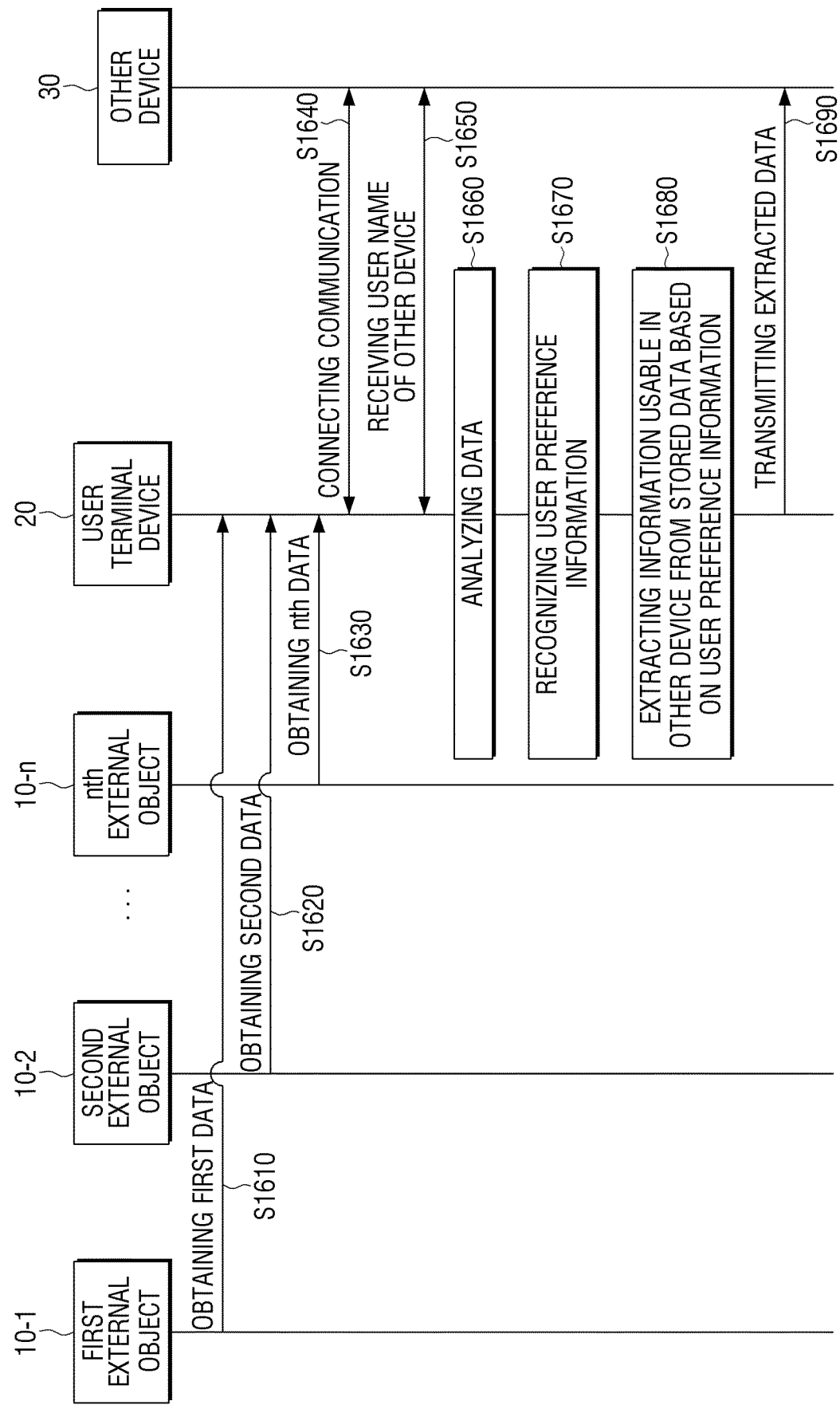
FIG. 27 is a timing view for describing a method of obtaining preference information on a user of the other device in accordance with an exemplary embodiment.

FIG. 27 is a timing view for describing a method of obtaining preference information on a user of the device in accordance with an exemplary embodiment. In particular, FIG. 27 is a view for describing a case that the user of the user terminal device 300 and the user of the device are same.

According to FIG. 27, the user terminal device 20 obtains data from a plurality of external objects 10-1, 10-2, ..., 10-$n$ in steps S1610 to S1630. Specifically, the user terminal device 20 obtains data 1 from the first external object 10-1, data 2 from the second external object 10-2 ... and data n from the nth external object 10-$n$.

In step S1640, the user terminal device 20 establishes a communication connection with the device 30. The device 30 may mean a device to which it is determined to provide information in FIGS. 2 and 3.

The user terminal device 20 receives user name of the device 30 from the other device 30 in step S1650, and determines whether the received user name of the device is the same as the user name stored in the user terminal device 20.

If it is determined that the user name of the device 30 is the same as the user name stored in the user terminal device 20, the user terminal device 20 analyzes the data obtained from the external objects 10-1 . . . 10-n in step S1660 and recognizes the user preference information in step S1670.

Specifically, the user terminal device 20 may analyze information included in data obtained from a plurality of external objects 10-1, 10-2, . . . , 10-n and may determine the preference information.

The user terminal device 20 extracts information usable by the device 30 from the stored data based on the user preference information in step S1680, and transmits the extracted information to the device 30 in step S1690.

Returning to FIG. 3, the controlling unit 330 controls communication modules including the communication unit 320 to establish communication with the device. If the communication unit 320 and the device have already established communication, a separate operation is not performed.

The controlling unit 330 transmits the message requesting the transmission of the user name of the device to the device, and receives the user name of the device. The controlling unit 330 may recognize the user preference information based on the data obtained from the external object if the user name of the received device is the same as the user name stored in the user terminal device 300.

The controlling unit 330 may generate the preference information of the user terminal device based on the information having the stored data, and may extract information usable by the device from the stored data based on the generated preference information. Specifically, the controlling unit 330 determines the information included in data stored by obtaining data from different external objects, and recognizes that the user's preference for the determined information.

In this case, the controlling unit 330 may recognize preferred information of a certain product or a certain location included in stored data, or may recognize preferred information by product category or location category.

Figure 28:
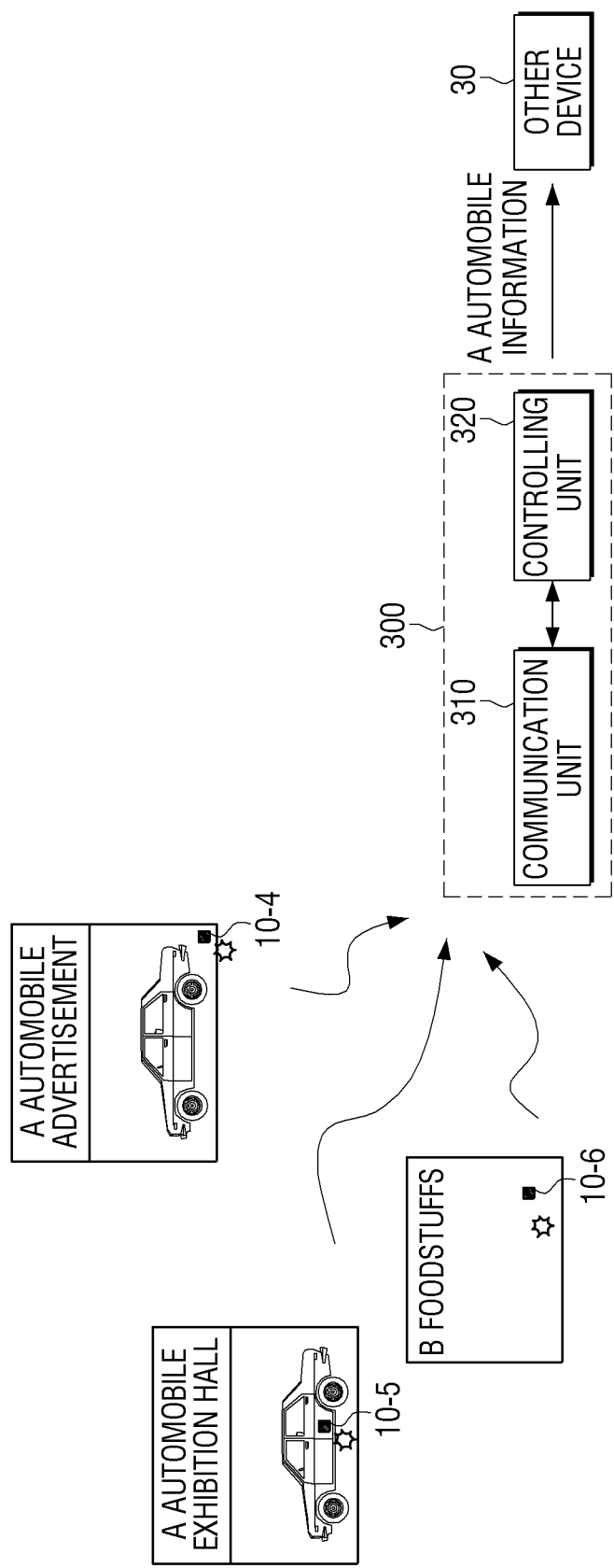
FIG. 28 is a view for describing a method of understanding the preference information of user in accordance with an exemplary embodiment.

FIG. 28 is a view for describing a method of recognizing the preference information of user in accordance with an exemplary embodiment.

In FIG. 28, the user terminal device 300 obtains data from the first external object 10-1 attached to an automobile advertisement flyer A, the second external object 10-2 attached to an automobile exhibition A, and the third external object 10-3 attached to foodstuffs B.

In this case, various information on automobile A, such as the automobile name, a manufacturer, a date of manufacture, and a URL link address related to the product, may be included in data obtained from the first external object. Likewise, various information on automobile A may be included in data obtained from the second external object 10-2, and various information on foodstuffs B may be included in data obtained from the third external object 10-3.

The controlling unit 330 may recognize the user's preference by analyzing an amount of similar information included in the stored data that refers to a product name, a manufacturer, and a URL link related to the product included in each data. Specifically, as in case of FIG. 28, the controlling unit 330 may determine that the user has a preference for automobile A, may extract information on automobile A from the stored data, and may transmit the extracted information to the device 30.

Figure 29:
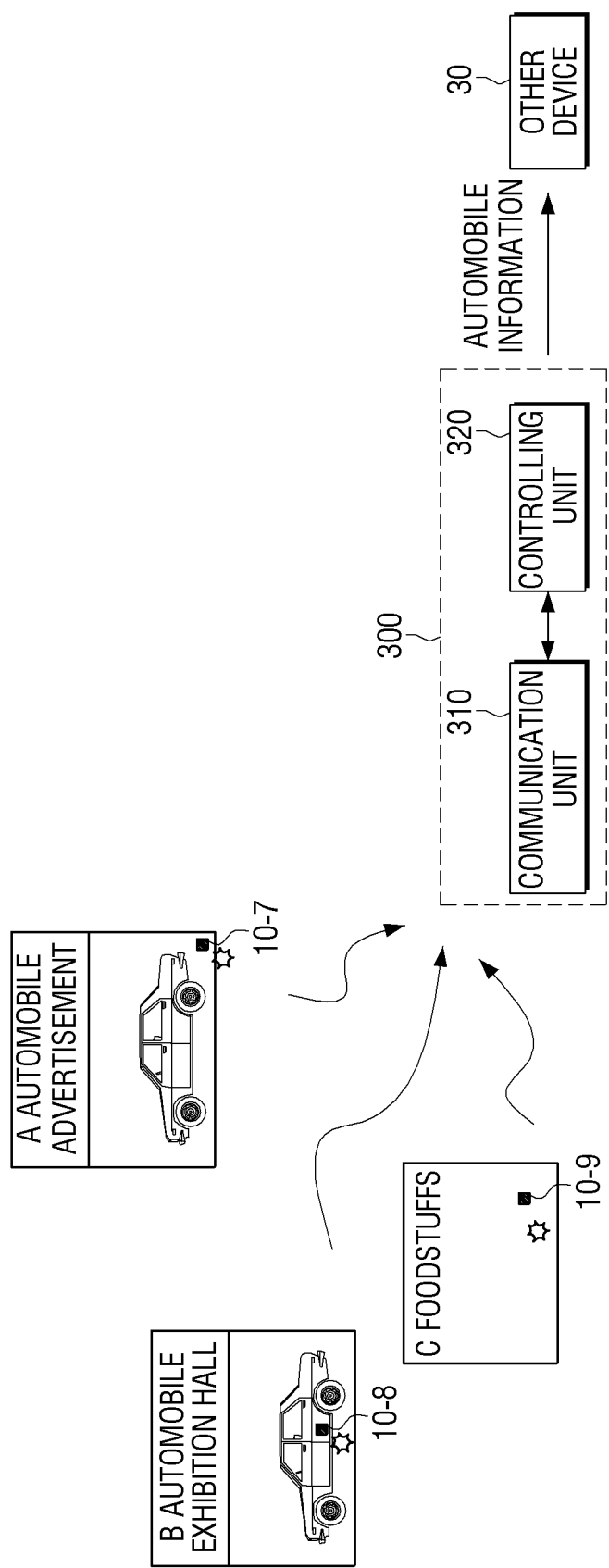
FIG. 29 is a view for describing a method of understanding the preference information of user in accordance with an exemplary embodiment.

FIG. 29 is a view for describing a method of recognizing the preference information of a user in accordance with an exemplary embodiment.

In FIG. 29, the user terminal device 300 obtains data from the first external object 10-7 attached to an automobile advertisement flyer A, the second external object 10-8 attached to an automobile exhibition B, and the third external object 10-9 attached to foodstuffs C.

In this case, various information on automobile A, such as the automobile name, a manufacturer, a date of manufacture, and a URL link address related to the product, may be included in data obtained from the first external object 10-7. Likewise, various information on automobile B may be included in data obtained from the external object 10-8, and various information on foodstuffs C may be included in data obtained from the third external object 10-9.

As in case of FIG. 29, information on a same product name, or a URL link related to a same product may not be included in data obtained from each external object 10-7, 10-8, and 10-9. In this case, the controlling unit 330 may determine the preference of the user by category. That is, the controlling unit may judge that the user prefers the automobile product category, and may extract information on automobiles from the stored data, such as information on automobile A obtained from the first external object 10-7 and information on automobile B obtained from the second external object 10-8, and may transmit the extracted information to the other device 30.

Figure 30:
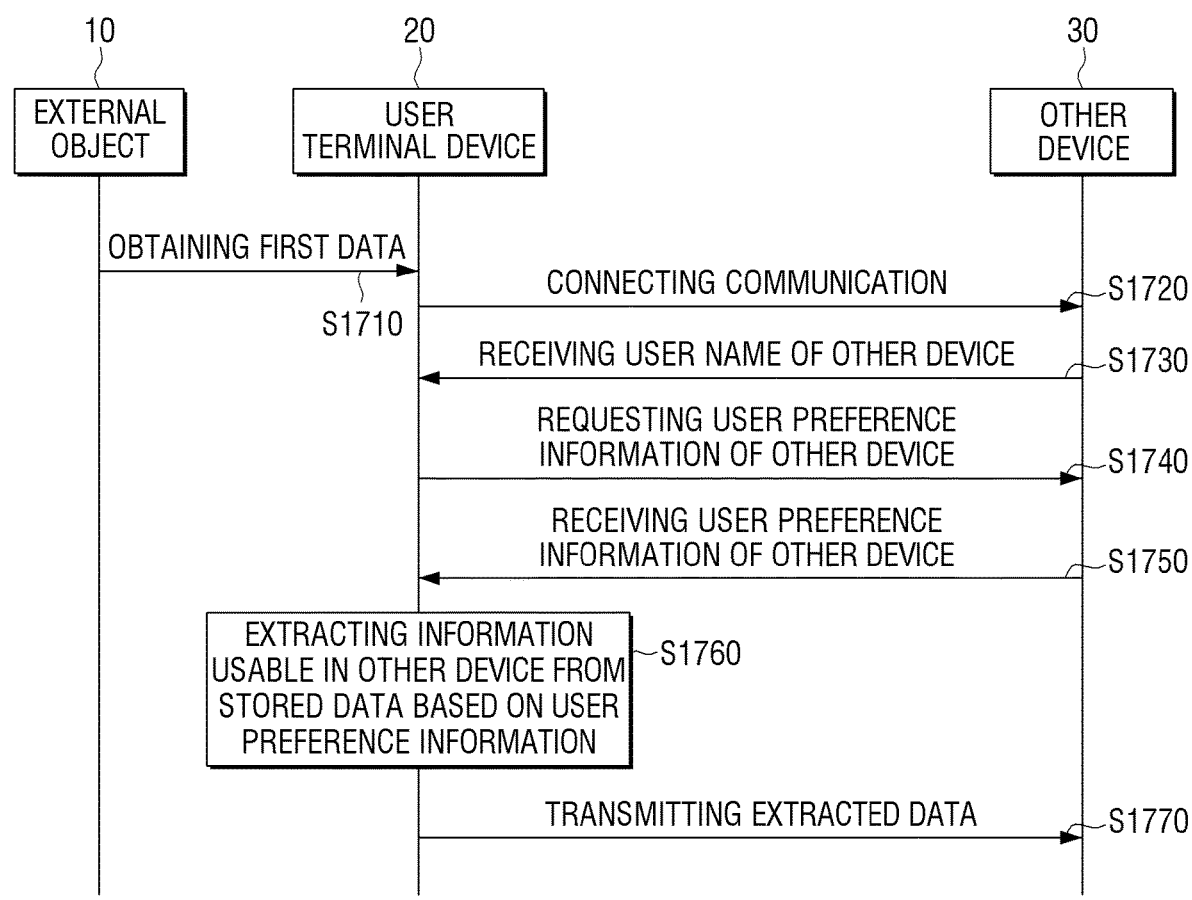
FIG. 30 is a timing view for describing a method of obtaining the preference information on a user of the other device in accordance with an exemplary.

FIG. 30 is a timing view for describing a method of obtaining a user's preference information in accordance with an exemplary embodiment. In particular, FIG. 30 is a view for describing the case when the user of the user terminal device 300 and the user of the other device are not the same.

According to FIG. 30, the user terminal device 20 obtains data from an external object 10 in step S1710.

The user terminal device 20 establishes a communication connection with the device 30 in step S1720. Here, the other device 30 may be a device to which it is determined to provide information in FIGS. 2 and 3.

The user terminal device 20 receives a user name of the device 30 from the device 30 in step S1730, and determines whether a received user name of the device 30 is the same as the user name stored in the user terminal device 20.

If it is judged that the user name of the device 30 is the same as the user name stored in the user terminal device 20, the user terminal device 20 requests transmission of the user preference information of the device 30 in step S1740.

The user terminal device 20 extracts information usable by the device 30 from the stored data based on the received user preference information in step S1760 after user preference information of the device 30 is received in step S1750, and transmits the extracted information to the device 30 in step S1770.

Referring to FIG. 3, the controlling unit 330 controls communication modules including the communication unit 320 to establish communication with the other device. Here, if communication between the communication unit 320 and the device is established, a separate operation is not performed.

The controlling unit 330 transmits the message requesting the transmission of the user name of the device through the communication unit 310 to the device, and receives the user name of the device. The controlling unit 330 may request the transmission of the user preference information of the device if the received a user name of the device is not same as the user name stored in the user terminal device 300, and may control the communication unit 310 to receive the preference information of the user of the device.

If the user preference information is received from the device, the controlling unit 330 may extract information usable by the device from the stored data based on the received user preference information.

Figure 31:
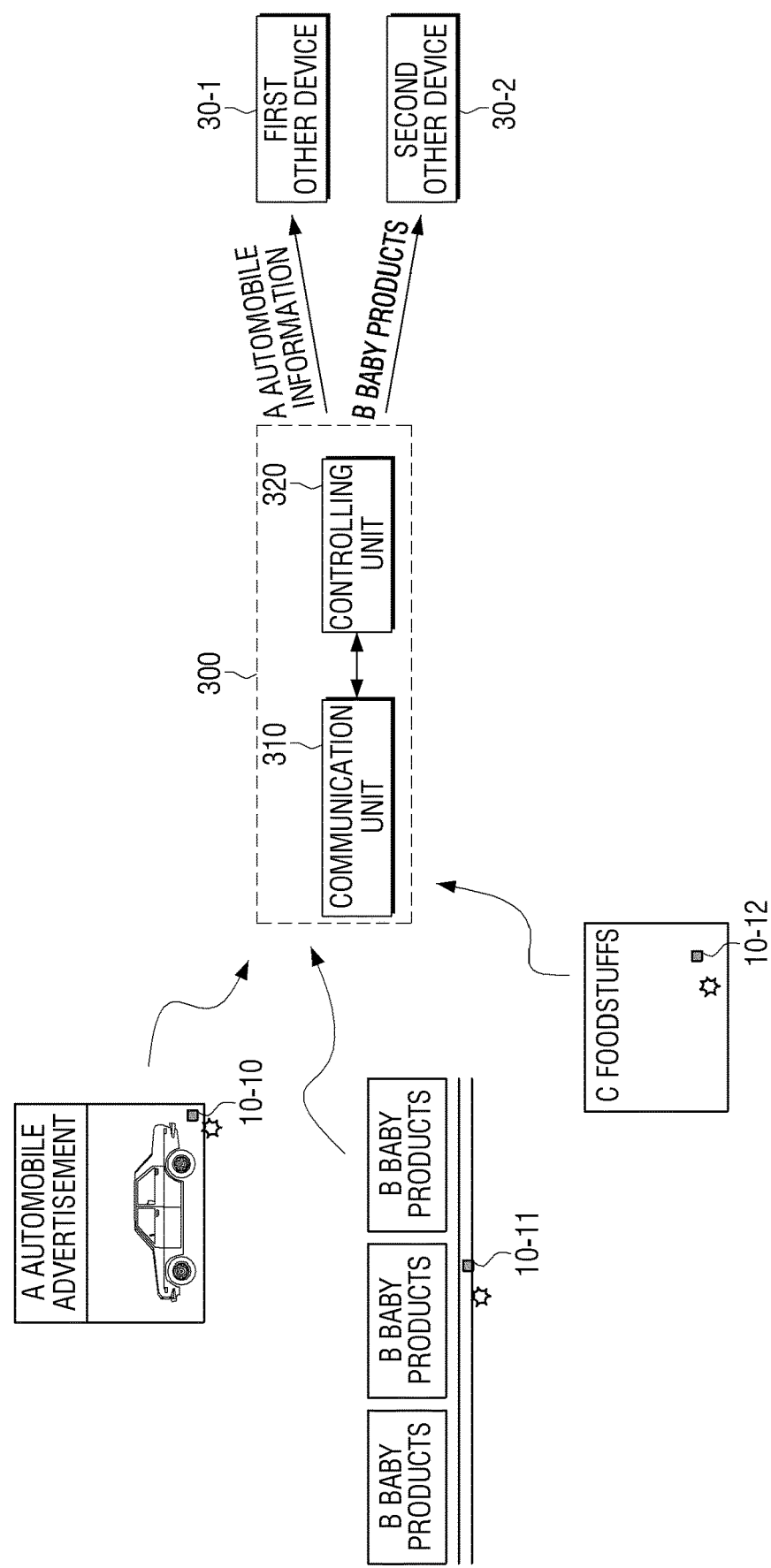
FIG. 31 is a view for describing a method of transmitting the extracted information by using the received preference information of a user in accordance with an exemplary embodiment.

FIG. 31 is a view for describing a method of transmitting extracted information by using user preference information in accordance with an exemplary embodiment.

In FIG. 31, it is assumed that the user preference information that the user terminal device 300 received from the first device 30-1 is automobile information and that that the user preference information that the user terminal device 300 received from the second device 30-2 is baby information.

Meanwhile, the user terminal device 300 may obtain data from the first external object 10-10 attached to an automobile advertisement flyer A, data from the second external object 10-11 attached to a stand on baby products B, and data from the third external object 10-12 attached to foodstuffs C.

In this case, various information on automobile A, such as the automobile name, a manufacturer, a date of manufacture, and a URL link related to the product may be included in data obtained from the first external object 10-10. Likewise, various information on baby products B may be included in data obtained from the second external object 10-11, and various information on foodstuffs C may be included in data obtained from the third external object 10-12.

The controlling unit 330 may extract information usable by each device from the stored data based on preference information of the user received from each device 30-1, 30-2.

Specifically, since the preference on user of the first device 30-1 is for an automobile, the controlling unit 330 may extract information related to the automobile among stored data, that is the only information included in data obtained from the first external object 10-10, and may transmit the information to the first device 30-1.

Likewise, since the preference on user of the first device 30-2 is for a baby product, the controlling unit 330 may extract information related to the baby product among stored data, that is the only information included in data obtained from the second external object 10-11, and may transmit the information to the second device 30-2.

Meanwhile, in terms of extracting information usable in the device based on the user information and transmitting the extracted information to the device, the user terminal device 300 may transmit various information corresponding to the user information of the device through a linkage with the server to the device.

Figure 32:
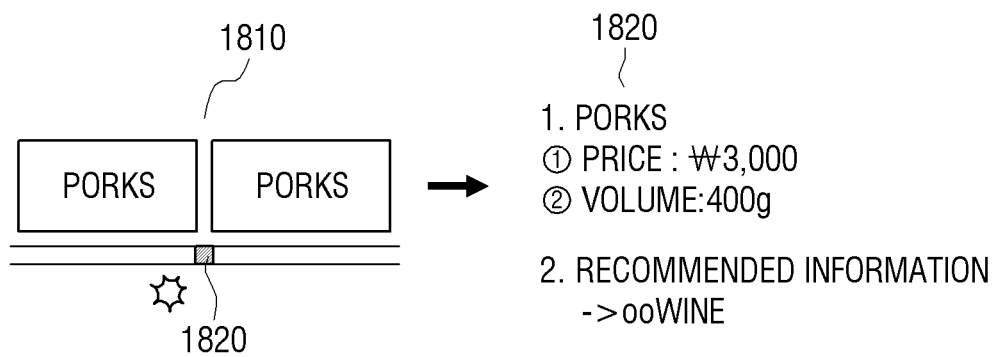
FIGS. 32 and 33 are views for explaining a method of receiving additional information by transmitting user information to a server in accordance with an exemplary embodiment.
Figure 33:
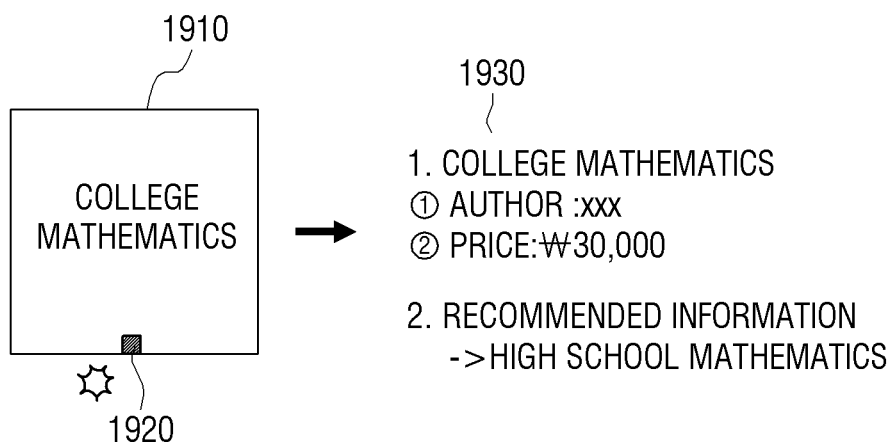

FIGS. 32 and 33 are views for describing methods of receiving additional information by transmitting the user information to the server in an exemplary embodiment. For convenience of the description, FIG. 17 is referenced.

The controlling unit 330 may control the second communication unit 370 to transmit the obtained data to the server and to receive information related to data obtained from the server. In this case, the controlling unit 330 may extract information corresponding to the user information from the obtained data, and may transmit the extracted information with the user information to the server. Thus, the server may search for information corresponding to the user information when searching for related information, and may transmit the information to the user terminal device 300.

FIGS. 32 and 33 are views for describing related information received according to the user information being transmitted to the server in accordance with an exemplary embodiment.

For example, as shown in FIG. 32, it is assumed that the user terminal device 300 obtained data on pork by using near field communication to an external object 1820 attached to a stand of pork 1810 products, and that the preference information on user of the other device indicates the user's preference for pork and alcohol.

The controlling unit 330 transmits information on pork extracted according to the user preference from the obtained data to the server. In this case, the controlling unit 330 may also transmit information on alcohol, which is other preference information among user preference information, to the server. Thus, the server may search information related to pork by considering alcohol, and may transmit the searched information to the user terminal device 300. Here, searched information may be alcohol information to be consumed with pork, and alcohol location needed to be avoided when eating pork.

Meanwhile, the controlling unit 330 may transmit information extracted from the obtained data and information received from the server to the device, and that information may be, as an example, the information on pork extracted from the obtained data illustrated on the right side 1820 of FIG. 32, or wine recommendation information received from the server.

For example, as shown in FIG. 33, it is assumed that the user terminal device 300 obtained data on college mathematics books by near field communication with an external object 1920 attached to college mathematics books 1910, and that the user's preference information of the device is a preference for information about mathematics books, and that the users are high school students.

The controlling unit 330 transmits information on college mathematics books extracted according to the user preference from the obtained data. In this case, the controlling unit 330 may also transmit information on user age, which is the other information among user information, to the server. Thus, the server may consider the age of the user when searching for related information by using information on college mathematics books. That is, the server may search for high school mathematics books that the author has written about topics in the college mathematics book or high school mathematics books published by the same publisher as the publisher of the college mathematics books, and may transmit the searched information to the user terminal device 300.

Meanwhile, the controlling unit 330 may transmit information extracted from the obtained data and information received from the server to the other device, and that information may be, as an example, information on college mathematics books extracted from the obtained data, as illustrated at the right side of FIG. 33, and high school mathematics books recommendation information.

Figure 34:
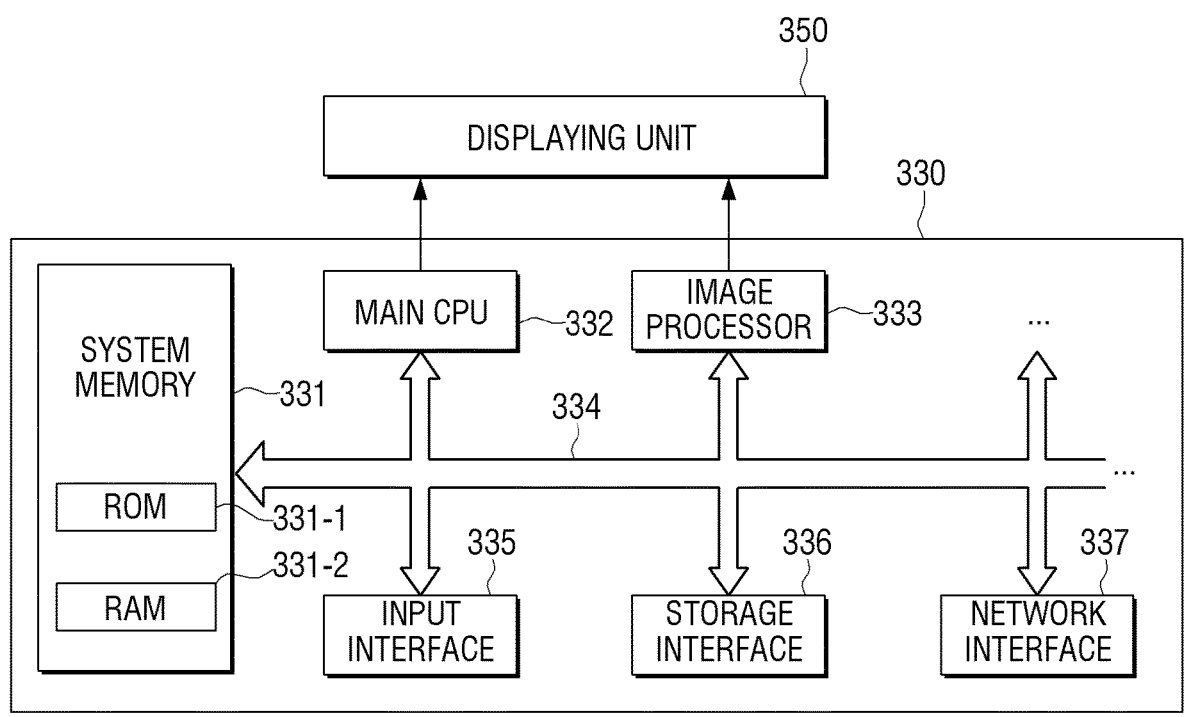
FIG. 34 is a block diagram for describing a specific detail structure of a controlling unit in accordance with an exemplary embodiment.

FIG. 34 is a block diagram for describing a specific detail composition of controlling unit in accordance with an exemplary embodiment. The controlling unit 330 includes a system memory 331, a main CPU 332, an image processor 333, a system but 334, a storing unit interface 335, an inputting unit interface 336, and a network interface 337.

The system memory 331, the main CPU 332, the image processor 333, the storing unit interface 335, the inputting interface 336, and the network interface 337 are connected to each other through the system bus 334, and may transmit and receive data or signals.

The system memory 331 includes a ROM 331-1 and a RAM 331-2. A command set for system booting is stored in the ROM 331-1. If power is provided, the main CPU 332 copies an operating system (O/S) stored in the storing unit 320 to the RAM 331-2 according to the command stored in the ROM 331-1, and performs operations by implementing application program copied in RAM 331-2.

As above, the main CPU 332 may perform various operations according to the implement of the application program stored in the storing unit 320.

The image processor 333 may include a decoder, a renderer, and a scaler. Thus, the stored data is decoded, framed is composed by rendering decoded data, and the size of the composed frame is scaled to suit the screen size of the displaying unit 350. The image processor 333 provides the processed frame to the displaying unit 350 and displays the frame.

In addition, the main CPU 332 may be connected to other components including the user terminal device 300 through interfaces 335, 336, and 337.

The inputting unit interface 335 may receive inputting signal inputted through the inputting unit 340.

In addition, the storing unit interface 336 is connected to the storing unit 320 and transmits and receives programs and data. As an example, if the user performs user operation corresponding to list confirmation order for confirming list on stored device, the main CPU 332 accesses to the storing unit 320 through the storing unit interface 336, generates the list on stored device, and displays the list on the displaying unit 350.

The network interface 337 is connected to the first communication unit 310 or the second communication unit 370, and may receive and transmit data or signals. For example, if a user input for communication connection with the server is received, the main CPU 332 accesses to the server through the network interface 327 connected to the second communication unit 370.

Figure 35:
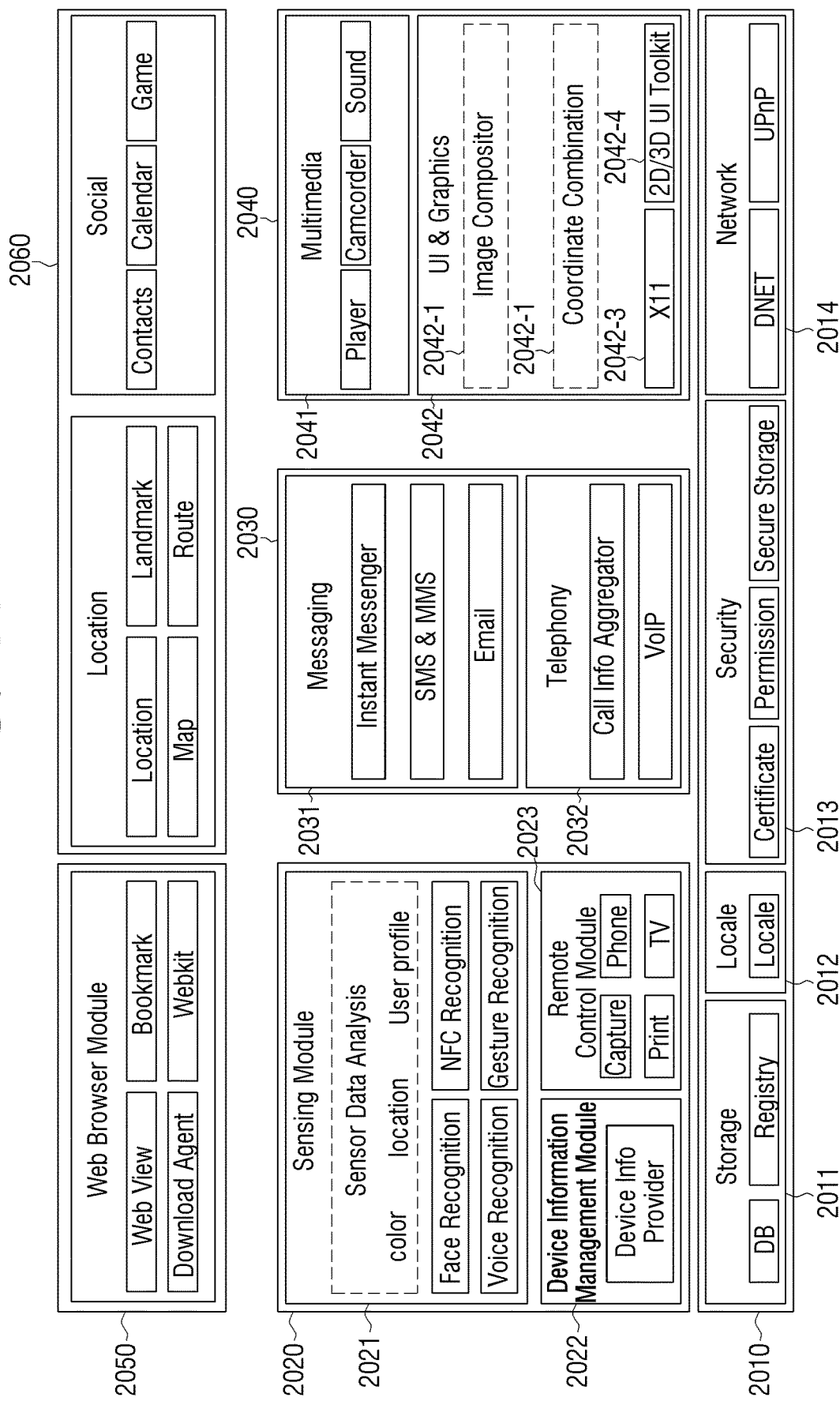
FIG. 35 is a view showing a software structure of a storing unit for supporting operation of a controlling unit in accordance with exemplary embodiments.

FIG. 35 is a view indicating the software structure of the storing unit for supporting operation of the controlling unit in accordance with exemplary embodiments.

According to FIG. 35, the storing unit 320 includes a base module 2010, a device management module 2020, a communication module 2030, a presentation module 2040, a web browser module 2050, and a service module 2060.

The base module 2010 is a base module that processes signals transmitted from hardware included in the user terminal device 300, and transmits the signals to the higher layer module.

The base module 2010 includes a storage module 2011, a location based module 2012, a security module 2013, and a network module 2014.

The storage muddle 2011 is a program module managing database (DB) or registry. The location based module 2012 is a program module supporting location based service by linking with hardware such as GPS chip. The security module 2013 is a program module supporting certification on hardware, request permission, and secure storage. The network module 2014 is a module for supporting network connection and includes DNET module and UPnP module.

The device management module 2020 is a module for managing and using information on an external input and an external device. The device management module 2020 may include a sensing module 2021, a device information management module 2022, and a remote control module 2023.

The sensing module 2021 is a module analyzing sensor data provided sensors (e.g. a touch sensor of the displaying unit 350) within the user terminal device 300. Specifically, the sensing module is a program module performing operation of detecting location of an object, location of a user, color, form, size and other profiles. The sensing module 2021 may include a face recognition module, a voice recognition module, a motion recognition module and a NFC recognition module. The device information management module 2022 is a module providing information on all sorts of devices. The remote control module 2023 is a program module performing operation of controlling devices remotely such as a telephone, TV, printer, camera, and air conditioner.

The communication module 2030 is a module for performing communication. The communication module 2030 may include a messaging module 2031 such as messenger program, SMS (Short Message Service), SMS & MMS (Multimedia Message Service) program, and email program, and a telephone module 2032 including call information aggregator program module, and VoIP module.

The presentation module 2040 is a module for the display screen. The presentation module 2040 includes a multimedia module 2041 for outputting multimedia contents by playing the contents, and a UI & graphic module 2042 performing UI and graphic process. The multimedia module 2041 may include a player module, a camcorder module, and a sound process module. Thus, the multimedia module performs operation of generating and playing screen and sound by playing all multimedia contents. The UI & graphic module 2042 may include, an image compositor module 2042-1 combining images, a coordinate combination module 2042-2 generating image by combining coordinates of screen to be displayed, a X11 module 2042-3 receiving all sorts of events from the hardware, and a 2D/3D toolkit 2042-4 providing tool for including UI in 2D or 3D form.

The web browser module 2050 is a module accessing to a web server by performing web browsing. The web browser module 2050 may include various modules, such as a web view module including a web page, a download agent module performing download, a bookmark module, and a web kit module.

The service module 2060 is an application module for providing various services. For example, the service module 2060 may include various modules, such as a navigation service module providing a map, present location, landmarks, and route information, a game module, and an advertisement application module.

The main CPU 332 within the controlling unit 330 accesses to the storing unit 32 through the storing unit interface 335, copies modules stored in the storing unit 320 into the RAM 331-2, and performs operation according to the operation of copied module.

Specifically, the main CPU 332 judges a location where a touch of the user is performed by analyzing output values of sensors by using the sensing module 2021, and detects corresponding information from database (DB) of the storage module 2010. The module corresponding to the detected information is operated to perform the operation.

As an example, if it is a GUI (Graphic User Interface) display operation, the main CPU 332 uses image combination module 2032-1 within the presentation module 2040 to compose the GUI screen. Then, the main CPU uses the coordinate combination module 2042-2 to determined display location of the GUI screen, and controls the displaying unit 350 to display GUI screen on that location.

Or in case user control corresponding to the message receiving operation is executed, the main CPU 332 implements the messaging module 2041 to access to the message management server, and receives the messages stored in the user account. Then, the main CPU 332 uses the presentation module 2040 to compose a screen corresponding to the received message, and displays the screen in the displaying unit 350.

Also, in case of performing a telephone call operation, the main CPU 332 may operate the telephone module 2032.

As above, the storing unit 320 may be stored with program of various structures, and the controlling unit 330 may perform operation in accordance with various embodiment described above by using programs stored in the storing unit 320.

Figure 36:
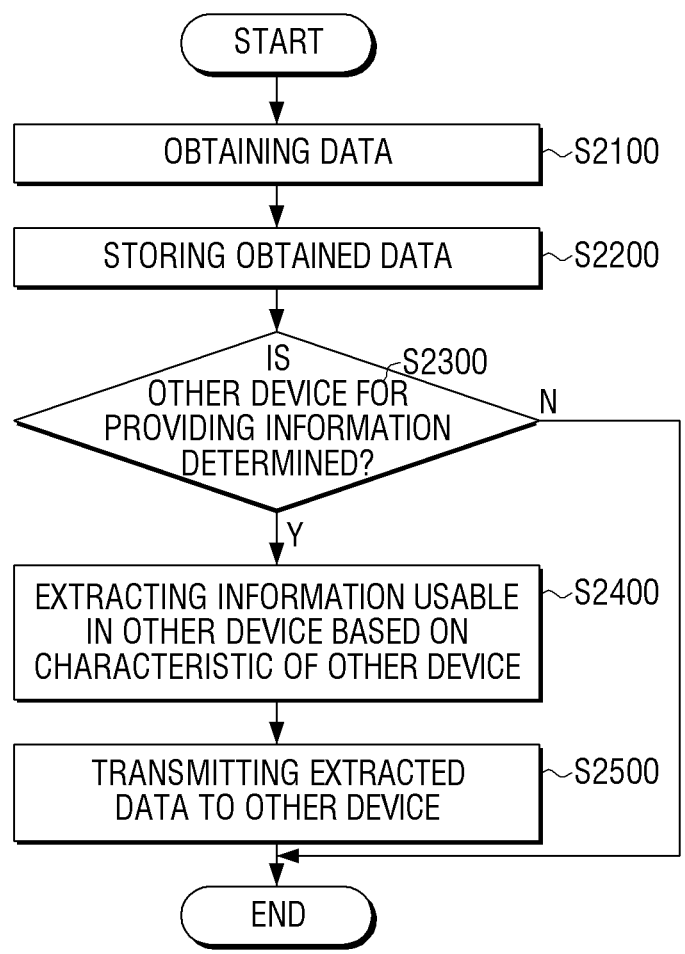
FIG. 36 is a flow chart for describing information providing method of a user terminal device in accordance with an exemplary embodiment.

FIG. 36 is a flow chart for describing an information providing method of a user terminal device in accordance with an exemplary embodiment.

First, data is obtained through the near field communication with an external object in step S2100. Here, the device may include the near field communication module to read data written in the near field communication tag by near field communication with the external object attached with the near field communication tag, and may obtain data.

The obtained data is stored in step S2200.

When the other device for providing information is determined in S2300-Y, information usable in another device is extracted from the stored data based on the characteristics of the device in S2400.

Specifically, to determine the device to which information is to be provided, the list on the device may be displayed and the device selected on the list may be determined as the other device for providing information. Or, if the user terminal device connects communication with the external device, the external device may be determined as the other device to which information is to be provided.

The characteristics of the other device may include the function of the other device.

Specifically, if the other device performs route guidance function, information usable in route guidance function the other device may be extracted from the stored data.

Various situations may be considered in extracting information usable in the other device.

First, information usable in the other device may be extracted from the stored data by considering location at which data is obtained.

Specifically, if the other device performs the route guidance function, location information may be extracted from the stored data when both location at which data is obtained and present location of the user terminal device are within the predetermined distance. And additional information may be extracted when location at which data is obtained and the present location of the user terminal device exceed the predetermined distance.

Meanwhile, if the device performs the route guidance function, the main location information may be extracted from the stored data when location at which data is obtained and present location of the user terminal device exceed the predetermined distance. The sub location information may be extracted from the stored data when both location at which data is obtained and the present location of the user terminal device are within the predetermined distance.

The information usable in the device may be extracted from the stored data based on the time at which the device to which information to be provided is determined.

Specifically, if the device performs route guidance function, main location information may be extracted from the stored data when the time at which the device to which information is to be provided is determined is within the time information included in stored data, and the sub location information may be extracted from the stored data when the time that the device to which information is to be provided is determined not to be within the time information included in stored data.

Information usable in the device may be extracted from the stored data by considering the kind of a network used in communication performance between the user terminal device and the device.

The characteristics of the device may include the user information of the device. Here, the user information may include the preference information the user of the device. The preference information the user of the other device may be received. Also, the preference information the user of the user terminal device may be generated based on the information including the stored data and information usable in the device may be extracted from the stored data based on the generated preference information.

The extracted information is provided to the other device in S2500. In this case, various wireless communications such as NFC, Bluetooth, Zigbee, and WiFi and wired communication may be used.

Meanwhile, the information providing method of the user terminal device in accordance with the embodiment may display a UI (User Interface) for selecting at least one of information from extracted information, and may provide the information selected through the UI to the device.

In addition, the information related to the data obtained from the server may be received by transmitting the obtained data to the server. In this case, related information may include information usable in the device.

Various exemplary embodiments described above in the user terminal device may identically be applied in the information providing method of the user terminal device, and a detailed description will be omitted.

A non-transitory computer readable medium in which a program performing the control method in accordance with the exemplary embodiments is stored may be provided.

The non-transitory computer readable medium is a medium storing data semi-permanently and in which reading is practicable by a device. Specifically, various applications or programs described above may be provided by being stored in the non-transitory computer readable medium, such as CD, DVD, hard disk, blue ray disk, USB, memory card, and ROM.

In addition, a bus is not illustrated in the block diagram illustrating about the display device, but communication among each components may be performed through a bus in the display device. In addition, a processor such as CPU and microprocessor performing various steps described above may further be included in the display device.

The foregoing exemplary embodiments are not to be construed as limiting. The aspects of the present application may be readily applied to other types of apparatuses. Also, the description of the exemplary embodiments of the is intended to be illustrative, and not to limit the scope of the claims, and many alternatives, modifications, and variations will be apparent to those skilled in the art.

What is claimed is:

1. A data providing method of a mobile terminal, the method comprising:
   obtaining data comprising location information of areas;
   identifying locations of the mobile terminal at which the mobile terminal obtains the data;
   in response to receiving a user input to select a target device, identifying the target device to which the obtained data is to be transmitted;
   identifying a time at which the mobile terminal identifies the target device;
   identifying a subset of the obtained data based on the identified time and distances between the locations of the mobile terminal at which the mobile terminal obtains the data and locations of the areas; and transmitting the identified subset of the obtained data to the target device.

2. The method as claimed in claim 1, wherein the obtaining the data comprises obtaining the data from an external data source by NFC.

3. The method as claimed in claim 2, wherein the obtaining the data comprises reading the data from an NFC tag of the external data source.

4. The method as claimed in claim 1, wherein the identifying the subset comprises:

parsing the data;

normalizing the parsed data; and selecting the subset from among the normalized data based on device information.

5. The method as claimed in claim 4, wherein the data is raw data of an external data source.

6. The method as claimed in claim 1, further comprising:

displaying a message requesting confirmation of the subset; and receiving an input indicating confirmation of the subset, wherein the transmitting further comprises transmitting the subset to the target device in response to receiving the input indicating confirmation of the subset.

7. A mobile terminal comprising:

a communication unit; and a controller configured to:

control the communication unit to obtain data comprising location information of areas, determine locations of the mobile terminal at which the mobile terminal obtains the data, identify a target device to which the obtained data is to be transmitted from the mobile terminal, in response to receiving a user input to select the target device, identify a time at which the mobile terminal identifies the target device, identify a subset of the obtained data based on the identified time and distances between the locations of the mobile terminal at which the mobile terminal obtains the data and locations of the areas, and control the communication unit to transmit the identified subset of the obtained data to the target device.

8. The mobile terminal as claimed in claim 7, wherein the communication unit comprises an NFC module, wherein the NFC module is configured to obtain the data from an external data source by NFC.

9. The mobile terminal as claimed in claim 8, wherein the NFC module is configured to read the data from an NFC tag of the external data source.

10. The mobile terminal as claimed in claim 7, wherein the controller is further configured to identify the subset by parsing the data, normalizing the parsed data, and selecting the subset from among the normalized data based on device information.

11. The mobile terminal as claimed in claim 10, wherein the data is raw data of an external data source.

12. The mobile terminal as claimed in claim 7, further comprising:

a display configured to display a message requesting confirmation of the subset; and an interface configured to receive an input indicating confirmation of the subset, wherein the controller is further configured to control the communication unit to transmit the subset to the target device in response to the interface receiving the input indicating confirmation of the subset.

13. A non-transitory computer-readable medium having embodied thereon a program for executing a method of controlling a mobile terminal to provide information from the mobile terminal to a target device, the method comprising:

obtaining data comprising a location information of areas;

determining locations of the mobile terminal at which the mobile terminal obtains the data;

in response to receiving a user input to select the target device, identifying the target device to which the obtained data is to be transmitted;

identifying a time at which the mobile terminal identifies the target device;

identifying a subset of the obtained data based on the identified time and distances between the locations of the mobile terminal at which the mobile terminal obtains the data and locations of the areas; and transmitting the identified subset of the obtained data to the target device.

* * * * *